(12) United States Patent
Stroebe et al.

(10) Patent No.: US 10,981,532 B2
(45) Date of Patent: Apr. 20, 2021

(54) VEHICLE TRIM COMPONENT

(71) Applicant: Shanghai Yanfeng Jinqiao Automotive Trim Systems Co. Ltd., Novi, MI (US)

(72) Inventors: Jennifer A. Stroebe, Holland, MI (US); Bart W. Fox, Zeeland, MI (US); Michael E. Phillips, Holland, MI (US); Dale Todd Glynn, Allendale, MI (US); Michael G. Zimmer, Belmont, MI (US); Mike Domine, Ada, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 16/685,658

(22) Filed: Nov. 15, 2019

(65) Prior Publication Data

US 2020/0079312 A1 Mar. 12, 2020

Related U.S. Application Data

(63) Continuation of application No. PCT/US2019/039590, filed on Jun. 27, 2019.
(Continued)

(51) Int. Cl.
*B60R 21/215* (2011.01)
*B60R 21/205* (2011.01)
(Continued)

(52) U.S. Cl.
CPC .......... *B60R 21/215* (2013.01); *B60R 21/205* (2013.01); *B29C 45/14786* (2013.01);
(Continued)

(58) Field of Classification Search
CPC ................ B60R 21/215; B60R 21/205; B60R 2021/23504; B29C 45/14786; B29K 2023/12; B29K 2713/00; B29L 2031/3038
(Continued)

(56) References Cited

U.S. PATENT DOCUMENTS 2,903,388 A 9/1959 Jonke et al.
4,015,872 A 4/1977 Loznak et al.
(Continued)

FOREIGN PATENT DOCUMENTS

CA 939473 A1 1/1974
CA 939473 A1 11/1975
(Continued)

OTHER PUBLICATIONS

Machine translation of EP0730947A2 (Year: 1996).*
(Continued)

*Primary Examiner* — James A English
*Assistant Examiner* — Kurtis Nielson
(74) *Attorney, Agent, or Firm* — Amin, Turocy & Watson, LLP

(57) ABSTRACT

A component for a vehicle interior is disclosed. The component may comprise a structural substrate, an airbag chute and a structure coupling the chute and structural substrate. The structure may comprise a rib injection molded onto the structural substrate; the structure may be bonded to the structural substrate. The chute may be welded to the structure and/or the structural substrate. The structural substrate may comprise a panel comprised of fibers; the structure may be comprised of resin. The structure may comprise an interface bonding the chute and structural substrate; the interface may comprise a molded feature/resin feature/ mounting area on the structural substrate; a structure/material/rib injection molded on the structural substrate; a bond; an attachment; a composite or resin material; a material comprising fibers; polypropylene with fibers. The component may comprise a trim component; an instrument panel; a trim panel.

20 Claims, 10 Drawing Sheets

Related U.S. Application Data

(60) Provisional application No. 62/691,584, filed on Jun. 28, 2018.

(51) Int. Cl.
*B29C 45/14* (2006.01)
*B29K 23/00* (2006.01)
*B29L 31/30* (2006.01)
*B60R 21/235* (2006.01)

(52) U.S. Cl.
CPC ...... *B29K 2023/12* (2013.01); *B29K 2713/00* (2013.01); *B29L 2031/3038* (2013.01); *B60R 2021/23504* (2013.01)

(58) Field of Classification Search
USPC .......................................................... 280/732
See application file for complete search history.

(56) References Cited

U.S. PATENT DOCUMENTS

| | | | |
|---|---|---|---|
| 4,124,242 A | 11/1978 | Canner | |
| 4,576,560 A | 3/1986 | Herman | |
| 4,766,025 A | 8/1988 | Sanok et al. | |
| 4,959,004 A | 9/1990 | Nowakowski | |
| 5,000,990 A | 3/1991 | Freeman | |
| 5,082,310 A | 1/1992 | Bauer | |
| 5,091,131 A | 2/1992 | Schumacher et al. | |
| 5,370,518 A | 12/1994 | Sasaki et al. | |
| 5,372,767 A | 12/1994 | Zimmermann et al. | |
| 5,456,490 A | 10/1995 | Carter et al. | |
| 5,580,651 A * | 12/1996 | Kerman | B60R 21/04 428/318.4 |
| 5,679,301 A | 10/1997 | Miklas et al. | |
| 5,683,796 A | 11/1997 | Komylo et al. | |
| 5,756,406 A | 5/1998 | Rittman et al. | |
| 5,779,262 A | 7/1998 | Totani et al. | |
| 5,803,487 A * | 9/1998 | Kikuchi | B60R 21/205 280/728.2 |
| 5,804,117 A | 9/1998 | Baba et al. | |
| 5,807,513 A | 9/1998 | Gebreselassie et al. | |
| 5,902,533 A | 5/1999 | Munger et al. | |
| 5,968,437 A | 10/1999 | Harada | |
| 5,968,439 A | 10/1999 | Grove | |
| 6,027,678 A | 2/2000 | Rehm et al. | |
| 6,079,733 A | 6/2000 | Towler | |
| 6,291,369 B1 | 9/2001 | Yoshikawa et al. | |
| 6,439,871 B1 | 8/2002 | Saito et al. | |
| 6,457,768 B1 | 10/2002 | Schroeder et al. | |
| 6,471,276 B1 | 10/2002 | Brunsman et al. | |
| 6,537,669 B1 | 3/2003 | Kaufmann | |
| 6,558,604 B1 * | 5/2003 | Beckmann | B29C 43/18 264/319 |
| 6,558,608 B2 | 5/2003 | Haraldsson et al. | |
| 6,685,863 B1 | 2/2004 | Yabushita et al. | |
| 6,739,856 B2 | 5/2004 | Cesano | |
| 6,756,003 B2 | 6/2004 | Kieltyka et al. | |
| 6,893,247 B2 | 5/2005 | Uytterhaeghe et al. | |
| 7,014,208 B2 | 3/2006 | DePue et al. | |
| 7,186,105 B2 | 3/2007 | Cesano | |
| 7,241,412 B2 | 7/2007 | Cesano | |
| 8,216,501 B2 | 7/2012 | Egerer et al. | |
| 8,474,861 B1 | 7/2013 | Twork | |
| 8,764,089 B2 | 7/2014 | Preisler et al. | |
| 8,939,745 B2 | 1/2015 | Fox et al. | |
| 9,010,800 B1 * | 4/2015 | Hunter | B29C 66/112 280/728.3 |
| 9,149,961 B2 | 10/2015 | Fox et al. | |
| 9,409,332 B2 | 8/2016 | Gregor Kroner | |
| 9,481,337 B2 | 11/2016 | Cowelchuk et al. | |
| 9,975,514 B1 * | 5/2018 | Simon | B60R 21/215 |
| 2001/0032377 A1 * | 10/2001 | Lubera | F16B 37/043 24/293 |
| 2002/0000711 A1 | 1/2002 | Schmidt et al. | |
| 2002/0042235 A1 | 4/2002 | Ueno et al. | |
| 2002/0121767 A1 * | 9/2002 | Preisler | B60R 21/216 280/728.3 |
| 2003/0149261 A1 | 8/2003 | Schramm et al. | |
| 2004/0043187 A1 | 3/2004 | Ota et al. | |
| 2005/0121818 A1 * | 6/2005 | Cowelchuk | B29C 70/78 264/138 |
| 2005/0269804 A1 | 12/2005 | Yamada et al. | |
| 2006/0017268 A1 * | 1/2006 | Bondoerffer | B60R 21/2165 280/732 |
| 2006/0220355 A1 * | 10/2006 | Yokoyama | B60R 21/215 280/728.3 |
| 2007/0108741 A1 * | 5/2007 | Yasuda | B29C 65/0618 280/728.3 |
| 2007/0187930 A1 * | 8/2007 | Chitteti | B60R 21/2165 280/728.2 |
| 2007/0290542 A1 | 12/2007 | Wada | |
| 2008/0048419 A1 | 2/2008 | Kong | |
| 2008/0292851 A1 * | 11/2008 | Egerer | B29C 45/14065 428/196 |
| 2009/0086068 A1 | 4/2009 | Hagiwara et al. | |
| 2009/0226676 A1 | 9/2009 | Smith et al. | |
| 2009/0250909 A1 | 10/2009 | Kuhne et al. | |
| 2009/0288542 A1 | 11/2009 | Matsuno | |
| 2010/0032080 A1 | 2/2010 | Nilsrud et al. | |
| 2010/0078920 A1 * | 4/2010 | Terai | B60R 21/215 280/728.3 |
| 2010/0109296 A1 * | 5/2010 | Mazzocchi | B60R 21/215 280/728.2 |
| 2010/0109297 A1 * | 5/2010 | Mazzocchi | B60R 21/215 280/728.2 |
| 2011/0316262 A1 * | 12/2011 | Mazzocchi | B60R 21/215 280/728.3 |
| 2012/0244323 A1 | 9/2012 | Dittmar | |
| 2013/0229024 A1 | 9/2013 | Schidan et al. | |
| 2015/0041081 A1 | 2/2015 | Banu et al. | |
| 2016/0375634 A1 * | 12/2016 | Magunia | B29C 35/0805 280/743.1 |
| 2017/0239859 A1 * | 8/2017 | Packett | B29C 45/14786 |
| 2018/0001856 A1 | 1/2018 | Yamada | |
| 2018/0050650 A1 * | 2/2018 | Watanabe | B60R 21/217 |
| 2018/0056556 A1 | 3/2018 | Hildebrandt | |
| 2018/0264756 A1 | 9/2018 | Giaraffa et al. | |

FOREIGN PATENT DOCUMENTS

| | | |
|---|---|---|
| CA | 1 138 161 A | 12/1982 |
| CA | 1 239 336 A | 7/1988 |
| CA | 1 258 561 A | 8/1989 |
| CA | 2 013 848 A1 | 10/1990 |
| CA | 2 018 966 A1 | 12/1990 |
| CA | 2 020 235 A1 | 12/1990 |
| CA | 2 018 882 A1 | 2/1991 |
| CA | 2 035 921 A1 | 9/1991 |
| CA | 1 291 603 C | 11/1991 |
| CA | 2 085 478 A1 | 1/1992 |
| CA | 1 314 366 C | 3/1993 |
| CA | 1 318 502 C | 6/1993 |
| CA | 2 137 347 A1 | 3/1994 |
| CA | 2 143 004 A1 | 6/1994 |
| CA | 2 119 694 A1 | 9/1994 |
| CA | 2 156 050 A1 | 9/1994 |
| CA | 2 156 061 A1 | 9/1994 |
| CA | 2 168 221 A1 | 2/1995 |
| CA | 2 187 446 A1 | 8/1996 |
| CA | 2 175 309 A1 | 11/1996 |
| CA | 2 223 779 A1 | 12/1996 |
| CA | 2 318 251 A1 | 7/1999 |
| CA | 2 318 554 A1 | 7/1999 |
| CA | 2 269 308 A1 | 10/1999 |
| CA | 2 334 853 A1 | 12/1999 |
| CA | 2 317 301 A1 | 3/2001 |
| CA | 2 400 641 A1 | 8/2001 |
| CA | 2 341 002 A1 | 9/2001 |
| CA | 2 322 343 A1 | 4/2002 |
| CA | 2 424 081 A1 | 4/2002 |
| CA | 2 380 114 A1 | 10/2003 |
| CA | 2 509 350 A1 | 6/2004 |

(56) References Cited

FOREIGN PATENT DOCUMENTS

| | | |
|---|---|---|
| CA | 2 528 219 A1 | 12/2004 |
| CA | 2 557 584 A1 | 9/2005 |
| CA | 2 570 816 A1 | 1/2006 |
| CA | 2 570 831 A1 | 1/2006 |
| CA | 2 589 120 A1 | 6/2006 |
| CA | 2 591 390 A1 | 7/2006 |
| CA | 2 602 166 A1 | 9/2006 |
| CA | 2 568 770 A1 | 6/2007 |
| CA | 2 634 260 A1 | 7/2007 |
| CA | 2 648 601 A1 | 10/2007 |
| CA | 2 647 317 A1 | 11/2007 |
| CA | 2 647 658 A1 | 11/2007 |
| CA | 2 651 595 A1 | 11/2007 |
| CA | 2 653 322 A1 | 12/2007 |
| CA | 2 658 572 A1 | 5/2008 |
| CA | 2 672 235 A1 | 7/2008 |
| CA | 2 674 316 A1 | 7/2008 |
| CA | 2 674 390 A1 | 7/2008 |
| CA | 2 674 457 A1 | 7/2008 |
| CA | 2 675 855 A1 | 7/2008 |
| CA | 2 689 506 A1 | 12/2008 |
| CA | 2 695 245 A1 | 2/2009 |
| CA | 2 733 552 A1 | 2/2009 |
| CA | 2 707 083 A | 7/2009 |
| CA | 2 756 724 A1 | 10/2010 |
| CA | 2 757 214 A1 | 10/2010 |
| CA | 2 772 425 A1 | 4/2011 |
| CA | 2 802 119 A1 | 12/2011 |
| CA | 2 847 272 A1 | 3/2013 |
| CN | 101218084 A | 7/2008 |
| CN | 101336157 A | 12/2008 |
| CN | 201304706 Y | 9/2009 |
| CN | 101678811 A | 3/2010 |
| CN | 101959724 A | 1/2011 |
| CN | 102470614 A | 5/2012 |
| DE | 2 122 581 A1 | 11/1972 |
| DE | 3614533 A1 | 11/1987 |
| DE | 100 526 93 A1 | 5/2001 |
| DE | 101 072 69 A1 | 8/2002 |
| DE | 101 223 12 A1 | 11/2002 |
| DE | 10 2004 054 228 A1 | 6/2006 |
| DE | 10 2006 000 657 A1 | 7/2007 |
| DE | 10 2009 055 983 A1 | 6/2011 |
| DE | 10 2010 063 751 A1 | 6/2012 |
| DE | 10 2011 014 244 A1 | 9/2012 |
| DE | 10 2006 000 657 B4 | 9/2014 |
| DE | 10 2004 006 487 B4 | 3/2015 |
| DE | 10 2013 224 934 A1 | 6/2015 |
| DE | 10 2015 109 597 A1 | 1/2017 |
| EP | 0730947 A2 * | 9/1996 ........... B29C 70/086 |
| EP | 0 748 722 A2 | 12/1996 |
| EP | 0 779 185 A2 | 6/1997 |
| EP | 0 779 185 A3 | 12/1999 |
| EP | 0 730 947 B1 | 8/2001 |
| EP | 1 410 958 A1 | 4/2004 |
| EP | 1 685 009 A1 | 8/2006 |
| EP | 1 897 669 A1 | 3/2008 |
| EP | 2 006 166 A1 | 12/2008 |
| EP | 1 986 835 B1 | 1/2011 |
| EP | 1 970 183 B1 | 11/2011 |
| EP | 3 192 636 A1 | 7/2017 |
| FR | 2 445 208 A1 | 7/1980 |
| JP | H5-185466 A | 7/1993 |
| JP | H6-143312 A | 5/1994 |
| JP | H7-195372 A | 8/1995 |
| JP | H7-195373 A | 8/1995 |
| JP | H8-142059 A | 6/1996 |
| JP | H11-207768 A | 8/1999 |
| JP | 3051288 B2 | 6/2000 |
| JP | 2001-517169 A | 10/2001 |
| JP | 2002-104125 A | 4/2002 |
| JP | 2003-154915 A | 5/2003 |
| JP | 2003191335 A * | 7/2003 ........... B29C 66/114 |
| JP | 2004009708 A * | 1/2004 ........... B29C 66/131 |
| JP | 2004-136698 A | 5/2004 |
| JP | 2004-314501 A | 11/2004 |
| JP | 2005-319637 A | 11/2005 |
| JP | 2007-283845 A | 11/2007 |
| JP | 2008-012838 A | 1/2008 |
| JP | 2004-9708 | 8/2008 |
| JP | 2008-254438 A | 10/2008 |
| JP | 2009-233994 A | 10/2009 |
| JP | 2010-47207 A | 3/2010 |
| JP | 2010-69854 A | 4/2010 |
| JP | 2010-173637 A | 8/2010 |
| WO | 099/02321 A1 | 1/1999 |
| WO | 1999/046106 A1 | 9/1999 |
| WO | 2005/049391 A1 | 6/2005 |
| WO | 2005/087601 A1 | 9/2005 |
| WO | 2007/135033 A1 | 11/2007 |
| WO | 2009/023038 A2 | 2/2009 |
| WO | 2009/045202 A1 | 4/2009 |
| WO | 2009/088904 A2 | 7/2009 |
| WO | 2009/023038 A3 | 9/2009 |
| WO | 2012/085070 A1 | 6/2012 |
| WO | 2013/033024 A2 | 3/2013 |
| WO | 2016/077773 A | 5/2016 |
| WO | 2017/097673 A1 | 6/2017 |
| WO | 2018/005197 | 1/2018 |

OTHER PUBLICATIONS

International Search Report and Written Opinion received for International Patent Application No. PCT/US2019/039590 dated Sep. 19, 2019, 15 pages.

* cited by examiner

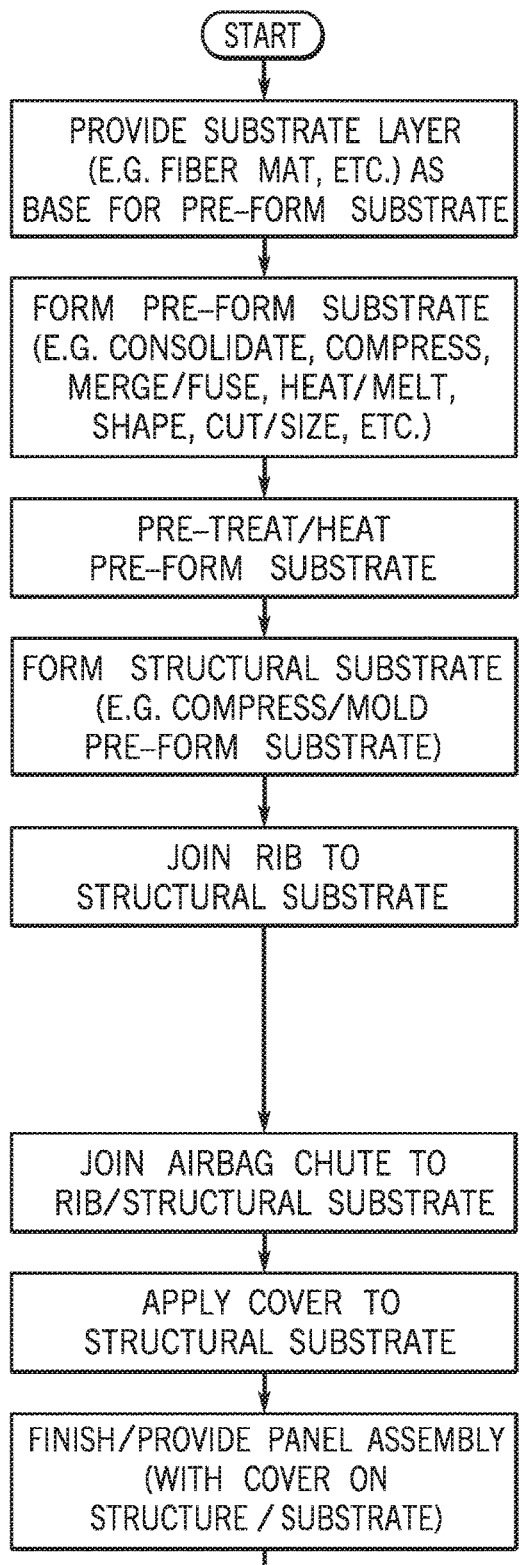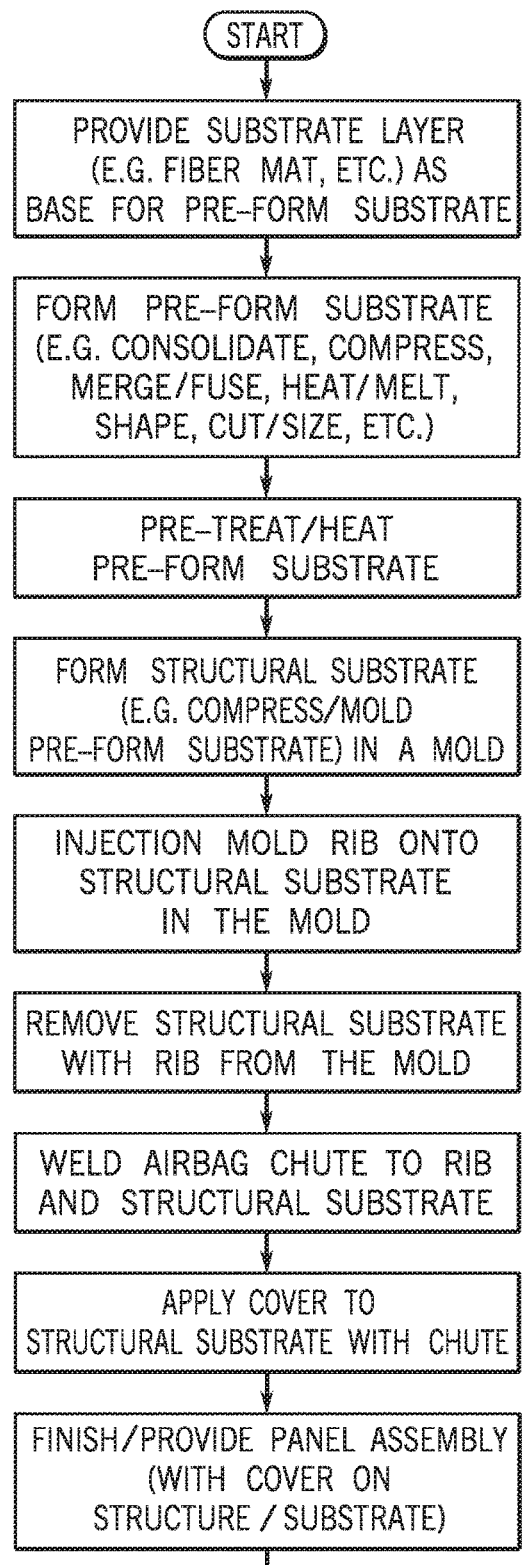

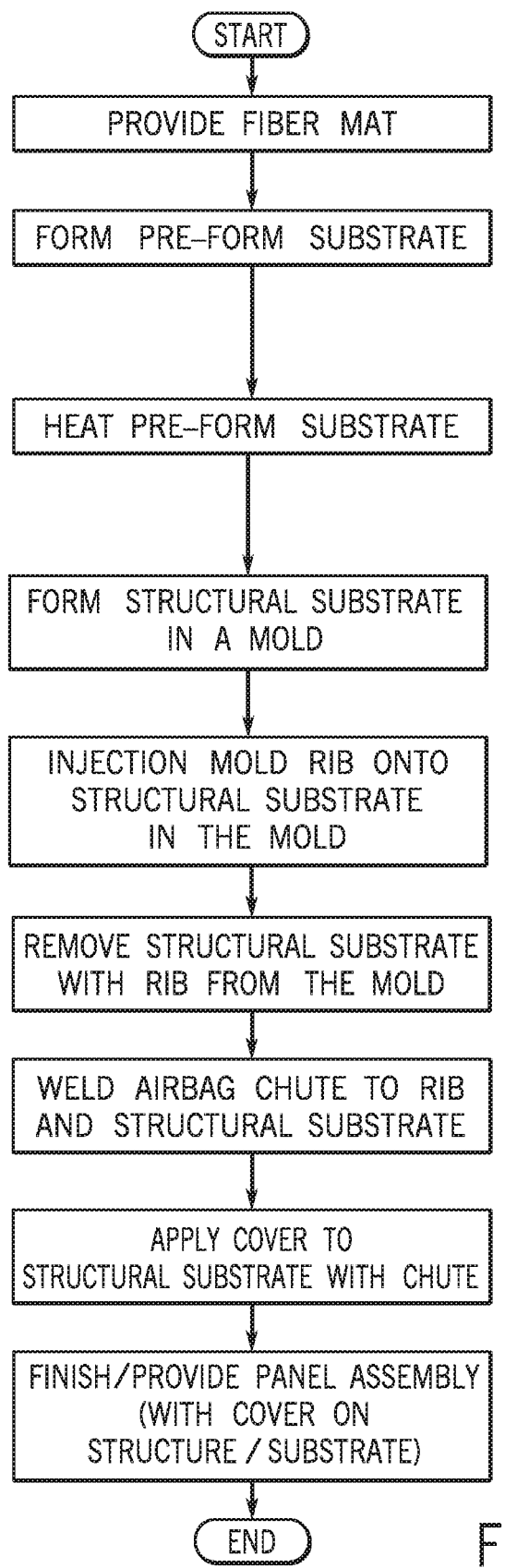
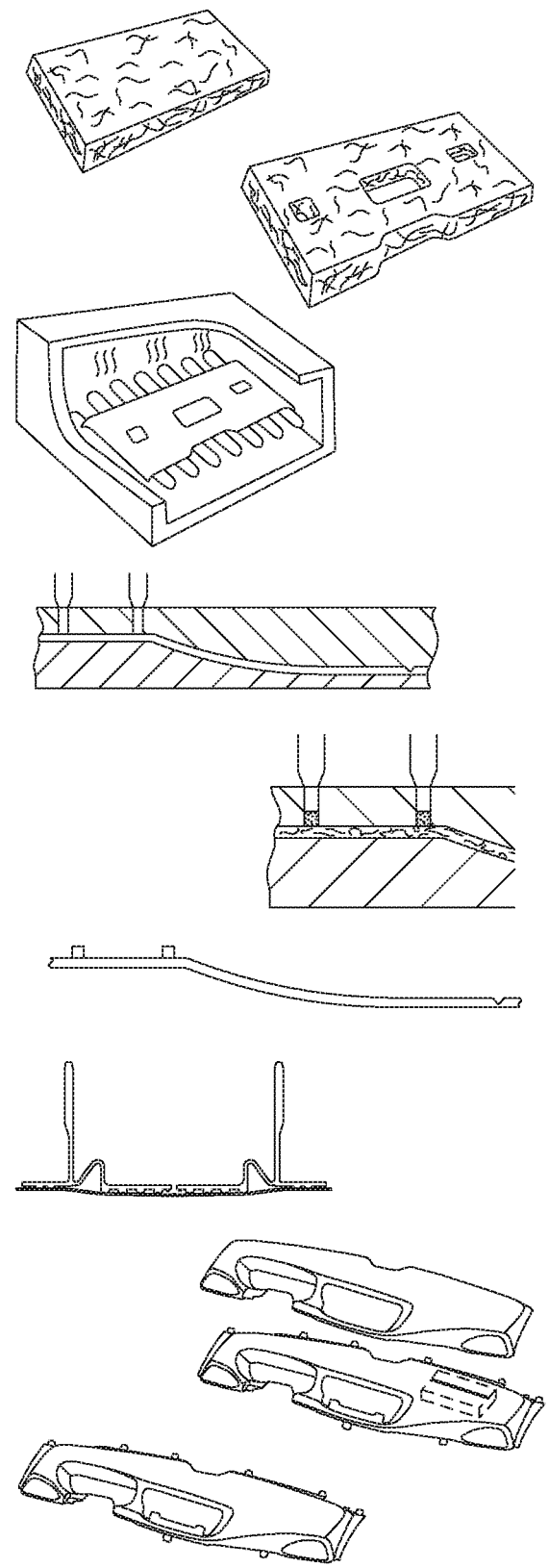
FIG. 11

VEHICLE TRIM COMPONENT

CROSS-REFERENCE TO RELATED APPLICATIONS

The present application is a continuation of International/PCT Patent Application No. PCT/US19/39590 titled "VEHICLE TRIM COMPONENT" filed Jun. 27, 2019, which claims the benefit of U.S. Provisional Patent Application No. 62/691,584 titled "VEHICLE TRIM COMPONENT" filed Jun. 28, 2018.

The present application claims priority to and incorporates by reference in full the following patent applications: (a) U.S. Provisional Patent Application No. 62/691,584 titled "VEHICLE TRIM COMPONENT" filed Jun. 28, 2018; (b) International/PCT Patent Application No. PCT/US19/39590 titled "VEHICLE TRIM COMPONENT" filed Jun. 27, 2019.

FIELD

The present invention relates to a vehicle trim component.

BACKGROUND

It is known to provide a trim component for a vehicle interior provided as an instrument panel, door panel and various other components. It is known to form the trim component with fibers by a compression forming process.

It would be advantageous to provide an improved trim component for a vehicle interior. It would also be advantageous to provide an improved trim component formed from a panel with a structure configured to secure an airbag chute to the panel during deployment of an airbag.

SUMMARY

The present invention relates to a component for a vehicle interior configured to support an airbag module providing an airbag configured to be deployed into the vehicle interior comprising: a structural substrate; an airbag chute; and a structure between the structural substrate and the airbag chute. The structure may be configured to couple the airbag chute to the structural substrate; the structural substrate may comprise a first material; the airbag chute may comprise a second material; the structure may comprise a third material; the third material may be different than the first material and the second material. The first material may comprise a composite comprising fibers; the third material may comprise a resin. The second material may comprise thermoplastic polyolefin. The structural substrate may comprise a fiber panel; the structure may comprise polypropylene. The structure may comprise polypropylene filled with structural fibers. The structural substrate may comprise a fiber panel; the structure may comprise a feature injection molded onto the structural substrate. The airbag chute may comprise a first flange and a second flange; the first flange may comprise a rib; the second flange may comprise a rib; the structure may comprise the rib of the first flange; the rib of the second flange, a rib injection molded onto the structural substrate adjacent the rib of the first flange; and a rib injection molded onto the structural substrate adjacent the rib of the second flange; the rib of the first flange may comprise a height; the rib injection molded onto the structural substrate adjacent the rib of the first flange may comprise a height; the height of the rib of the first flange may be generally the same as the height of the rib injection molded onto the structural substrate adjacent the rib of the first flange. The component may comprise at least one of (a) a trim component; (b) an instrument panel; (c) a trim panel.

The present invention relates to a component for a vehicle interior configured to provide a module with an airbag configured to be deployed through an opening into the vehicle interior comprising: a structural substrate; an airbag chute; and an interface configured to couple the structural substrate and the airbag chute. The interface may comprise a feature on the structural substrate; the interface may comprise (a) a bond of the feature to the structural substrate and (b) coupling the airbag chute to the feature. The bond may comprise injection molding of the feature to the structural substrate. The interface may comprise a structure comprising at least one of (a) a composite material; (b) a resin material; (c) a material comprising fibers; (d) polypropylene with fibers; (e) a material molded onto the structural substrate. The structural substrate may comprise a composite comprising fibers; the feature may comprise a resin. The structural substrate may comprise a fiber panel; the feature may comprise polypropylene. The structural substrate may comprise a first material; the airbag chute may comprise a second material; the feature may comprise a third material different than the first material and the second material.

The present invention relates to a component for a vehicle interior configured to provide a module with an airbag configured to be deployed through an opening into the vehicle interior comprising: a structural substrate; an airbag chute; and an interface configured to couple the structural substrate and the airbag chute. The interface may comprise a feature on the structural substrate; the interface may comprise (a) a bond between the feature on the structural substrate and the airbag chute; and (b) a bond to a surface of the structural substrate. The interface may comprise at least one of (a) a molded feature on the structural substrate; (b) a resin feature on the structural substrate; (c) a mounting area on the structural substrate; (d) a structure injection molded on the structural substrate; (e) a rib; (f) a set of ribs; (g) a rib injection molded onto the structural substrate; (h) a flange on airbag chute; (i) a weld; (j) an ultrasonic weld; (k) a bond; (l) an attachment; (m) a composite material; (n) a resin material; (o) a material comprising fibers; (p) polypropylene with fibers; (q) a material molded onto the structural substrate. The structural substrate may comprise a first material; the feature may comprise a second material different than the first material; the feature may be bonded to the structural substrate. The structural substrate may comprise a fiber panel; the feature may be molded on the fiber panel. The structural substrate may comprise a composite comprising fibers; the feature may comprise a resin. The structural substrate may comprise a compression-formed component; the feature may comprise an injection molded rib.

The present invention relates to a vehicle interior component comprising: a structural substrate comprising a fiber panel providing a feature; an airbag chute bonded to the structural substrate. The feature of the structural substrate may be molded onto the fiber panel; the airbag chute may be bonded to the structural substrate at the feature of the structural substrate; the feature of the structural substrate may comprise a resin material; the fiber panel may comprise a plurality of fibers and a resin material; the airbag chute may comprise a thermoplastic material. The resin material of the feature of the structural substrate may comprise at least one of (a) thermoplastic resin; (b) polypropylene; (c) polypropylene with fibers. The resin material of the fiber panel may comprise at least one of (a) thermoplastic resin; (b) polypropylene; (c) acrylonitrile butadiene styrene; (d) polycarbonate. The feature may be injection-molded onto the fiber panel. The thermoplastic material of the airbag chute may comprise a thermoplastic polyolefin. The airbag chute may be bonded to the feature of the structural substrate at a bond formed by ultrasonic welding. The bond may comprise ultrasonic welding of the thermoplastic material of the airbag chute to the resin material of the feature of the structural substrate at an interface. The airbag chute may comprise an integrally-formed feature; the integrally-formed feature of the airbag chute may be bonded to the structural substrate. The integrally-formed feature of the airbag chute may be bonded to the structural substrate at a bond formed by ultrasonic welding. The bond formed by ultrasonic welding may comprise an interface between the airbag chute and the structural substrate.

The present invention relates to a component for a vehicle interior configured to support an airbag module providing an airbag configured to be deployed through an opening into the vehicle interior. The component may comprise a structural substrate and an airbag chute; and a structure between the structural substrate and the airbag chute; the structure may be configured to couple the airbag chute to the structural substrate. The structure may be configured to couple the airbag chute to the structural substrate during deployment of the airbag; the structure may comprise a rib injection molded onto the structural substrate; the structure may be bonded to the structural substrate. The airbag chute may be welded to the structure; the airbag chute may be welded to the structure and the structural substrate. The structural substrate may comprise a panel comprised at least partially of fibers; the structure may be comprised of resin. The structural substrate may comprise a first material; the airbag chute may comprise a second material; the structure may comprise a third material; the third material may be different than the first material and the second material. The first material may comprise a composite comprising fibers; the second material may comprise thermoplastic polyolefin; the third material may comprise a resin. The structural substrate may comprise a fiber panel; the airbag chute may comprise a thermoplastic polyolefin; the structure may comprise polypropylene. The structure may comprise polypropylene filled with structural fibers. The airbag chute may be welded to the structural substrate; the airbag chute may be welded to the structure. The structure may comprise a composite comprising fibers; the fibers may be configured to reinforce an interface between the airbag chute and the structural substrate. The airbag chute may comprise at least one flange; the structure may be positioned between the structural substrate and the at least one flange of the airbag chute. The airbag chute may comprise a first flange and a second flange; the first flange may comprise a rib; the second flange may comprise a rib; the structure may comprise the rib of the first flange; the rib of the second flange, a rib injection molded onto the structural substrate adjacent the rib of the first flange; and a rib injection molded onto the structural substrate adjacent the rib of the second flange. The rib injection molded onto the structural substrate adjacent the rib of the first flange may comprise a set of ribs surrounding the rib of the first flange. The rib of the first flange may comprise a height; the rib injection molded onto the structural substrate adjacent the rib of the first flange may comprise a height; the height of the rib of the first flange may be generally the same as the height of the rib injection molded onto the structural substrate adjacent the rib of the first flange. The structure may comprise an interface configured to bond the airbag chute to the structural substrate. The component may comprise at least one of (a) a trim component; (b) an instrument panel; (c) a trim panel.

The present invention relates to a component for a vehicle interior configured to provide a module with an airbag configured to be deployed through an opening into the vehicle interior comprising a structural substrate, an airbag chute and an interface configured to couple the structural substrate and the airbag chute; the interface may comprise a feature on the structural substrate. The substrate may comprise a compression-formed component formed from a fiber panel. The interface may comprise (a) a bond of the feature to the structural substrate and (b) coupling the airbag chute to the feature. The bond may comprise injection molding of the feature to the structural substrate. The interface may comprise a bond comprising at least one of a weld and/or an adhesive. The interface may comprise a bond configured to attach the feature to the surface of the structural substrate. The interface may comprise (a) a bond between the feature on the structural substrate and a feature of the airbag chute; and (b) a bond to a surface of the structural substrate. The interface may comprise at least one molded feature. The interface may comprise a structure; the structure of the interface may comprise at least one of (a) a composite material; (b) a resin material; (c) a material comprising fibers; (d) polypropylene with fibers; (e) a material molded onto the structural substrate. The component may comprise a composite structure comprising the structural substrate and the airbag chute; the airbag module may be configured to deploy the airbag through an opening in the composite structure. The interface may comprise the feature and a mounting area on the structural substrate. The interface may comprise the feature on the structural substrate and a feature of the airbag chute. The interface may comprise a bond configured to attach the feature of the airbag chute to the structural substrate; the feature of the airbag chute may comprise at least one flange. The interface may comprise a bond to a surface of the structural substrate. The interface may comprise at least one of (a) a molded feature on the structural substrate; (b) a resin feature on the structural substrate; (c) a mounting area on the structural substrate; (d) a structure injection molded on the structural substrate; (e) a rib; (f) a set of ribs; (g) a rib injection molded onto the structural substrate; (h) a flange on airbag chute; (i) a weld; (j) an ultrasonic weld; (k) a bond; (l) an attachment; (m) a composite material; (n) a resin material; (o) a material comprising fibers; (p) polypropylene with fibers; (q) a material molded onto the structural substrate. The component may comprise at least one of (a) a trim component; (b) an instrument panel; (c) a trim panel.

The present invention relates to a component for a vehicle interior configured to support an airbag module providing an airbag for deployment through an opening into the vehicle interior prepared using a mold by a process comprising the steps of: (a) providing a fiber panel; (b) compressing the fiber panel in the mold; (c) forming a feature on the structural substrate; and (d) joining an airbag chute to the structural substrate. The feature may be configured to couple the airbag chute to the structural substrate. The step of forming a feature on the structural substrate may comprise forming a structure for joining the airbag chute to the structural substrate. The feature may comprise an injection-molded structure. The step of joining an airbag chute to the structural substrate may comprise welding the airbag chute to the structure. The step of joining an airbag chute to the structural substrate may comprise welding the airbag chute to the structural substrate. The step of compressing the fiber panel in the mold may comprise compressing the fiber panel into a structural substrate having a shape. The process may comprise the step of forming a composite structure comprising a cover on the structural substrate.

The present invention relates to a method of manufacturing a vehicle component configured to support an airbag module providing an airbag for deployment from the airbag module through an opening into the vehicle interior comprising the steps of: (a) providing a fiber panel; (b) compressing the fiber panel in a mold to form a structural substrate; (c) molding a structure on the structural substrate; and (d) joining an airbag chute to the structure. The structure may be configured to couple the airbag chute to the structural substrate. The step of molding a structure on the structural substrate may comprise injecting resin into the mold. The step of joining an airbag chute to the structure may comprise welding the airbag chute to the structure. The step of joining an airbag chute to the structure may further comprise welding the airbag chute to the structural substrate.

The present invention relates to a trim component for a vehicle interior configured to support an airbag module providing an airbag configured to be deployed through an opening into the vehicle interior. The trim component may comprise a structural substrate providing a front side, a back side and at least one door established upon deployment of the airbag to facilitate deployment of the airbag from the airbag module through the opening, an airbag chute and a structure positioned between the structural substrate and the airbag chute. The structure may be configured to secure the airbag chute to the structural substrate. The structure may be configured to secure the airbag chute to the structural substrate during deployment of the airbag. The structure may comprise a rib injection molded onto the back side of the structural substrate. The structure may be bonded to the structural substrate. The structural substrate may comprise a panel comprised at least partially of fibers; the reinforcement may be comprised of resin. The structural substrate may comprise a fiber panel; the airbag chute may comprise a thermoplastic polyolefin; the structure may comprise polypropylene. The structure may comprise polypropylene filled with structural fibers. The airbag chute may be welded to the structure. The airbag chute may be welded to the structural substrate. The structure may comprise a composite comprising fibers; the fibers may be configured to reinforce an interface between the airbag chute and the structural substrate. The airbag chute may comprise at least one flange; the structure may be positioned between the structural substrate and the at least one flange of the airbag chute.

The present invention relates to a trim component for a vehicle interior configured to support an airbag module providing an airbag for deployment through an opening into the vehicle interior prepared using a mold by a process comprising the steps of providing a fiber panel; disposing the fiber panel onto a first surface of the mold; compressing the fiber panel between the first surface and a second surface of the mold to form the fiber panel into a structural substrate having a shape corresponding to a first contour of the first surface and a second contour of the second surface; molding a structure on a side of the structural substrate; and joining an airbag chute to the structure. The structure may be configured to secure the airbag chute to the structural substrate. The structure may be configured to secure the airbag chute to the structural substrate during deployment of the airbag. Molding the structure on a side of the structural substrate may comprise injecting resin into the mold. Joining an airbag chute to the structure may comprise welding the airbag chute to the structure. Joining an airbag chute to the structure may comprise welding the airbag chute to the structural substrate.

The present invention relates to a method of manufacturing a vehicle trim component configured to support an airbag module providing an airbag for deployment from the airbag module through an opening into the vehicle interior comprising the steps of providing a fiber panel; disposing the fiber panel onto a first surface of a mold; compressing the fiber panel between the first surface and a second surface of the mold to form the fiber panel into a structural substrate having a shape corresponding to a first contour of the first surface and a second contour of the second surface; molding a structure on a side of the structural substrate; and joining an airbag chute to the structure. The structure may be configured to secure the airbag chute to the structural substrate. Molding a structure on a side of the structural substrate may comprise injecting resin into the mold. Joining an airbag chute to the structure may comprise welding the airbag chute to the structure. Joining an airbag chute to the structure may comprise welding the airbag chute to the structural substrate.

FIGURES

FIG. 10A is a schematic flow diagram of a method for forming a vehicle interior component according to an exemplary embodiment.

FIG. 10B is a schematic flow diagram of a method for forming a vehicle interior component according to an exemplary embodiment.

FIG. 11 is a schematic flow diagram of a method for forming a vehicle interior component according to an exemplary embodiment.

DESCRIPTION

Figure 1A:
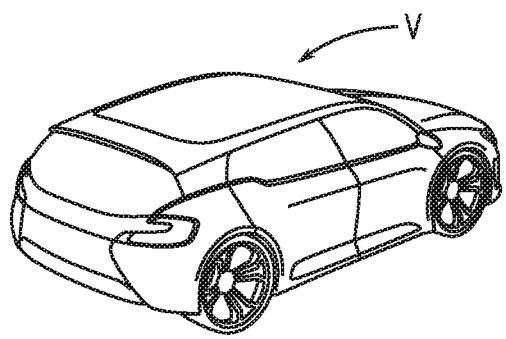
FIG. 1A is a schematic perspective view of a vehicle according to an exemplary embodiment.
Figure 1B:
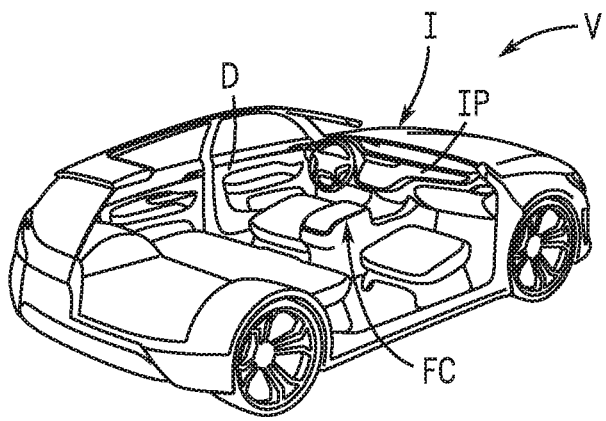
FIG. 1B is a schematic perspective cut-away view of a vehicle showing a vehicle interior according to an exemplary embodiment.
Figure 1C:
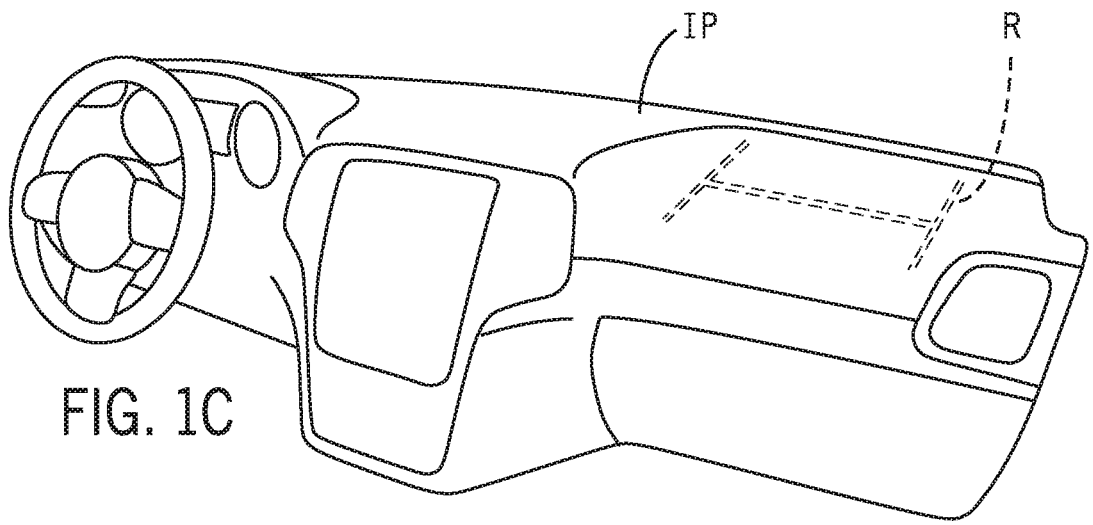
FIG. 1C is a schematic perspective view of a vehicle trim component shown as an instrument panel according to an exemplary embodiment.
Figure 1D:
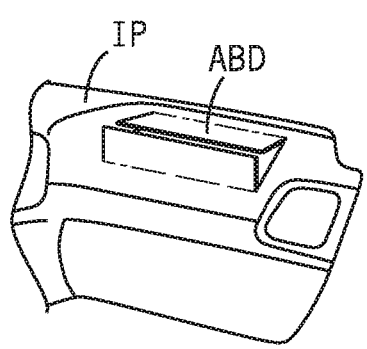
FIGS. 1D through 1F are schematic perspective detail views of an airbag deployment according to an exemplary embodiment.
Figure 1E:
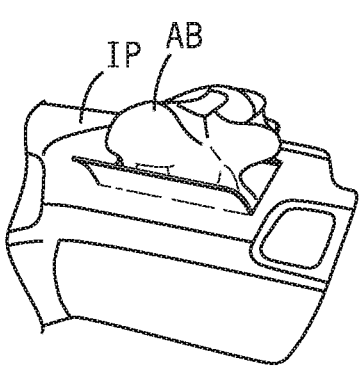
Figure 1F:
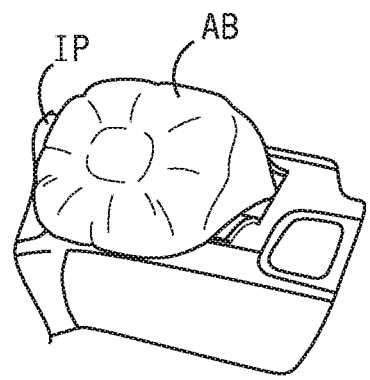
Figure 2A:
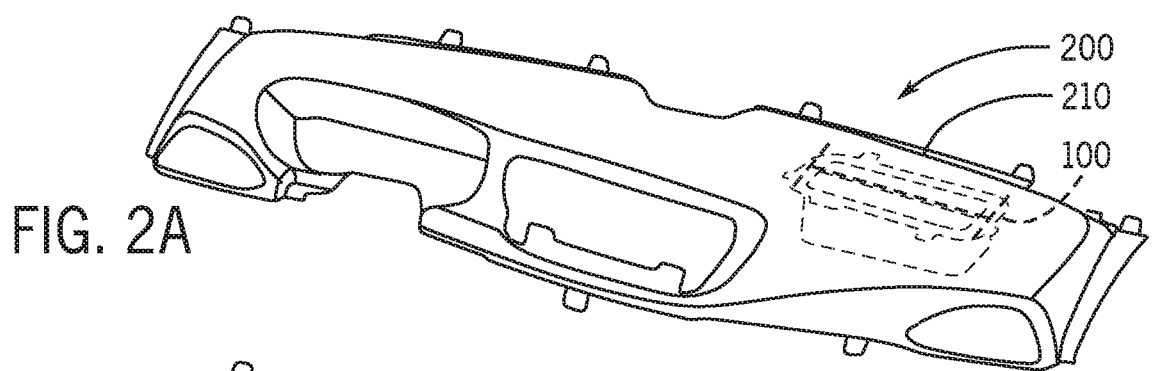
FIG. 2A is a schematic perspective view of a vehicle trim component according to an exemplary embodiment.
Figure 2B:
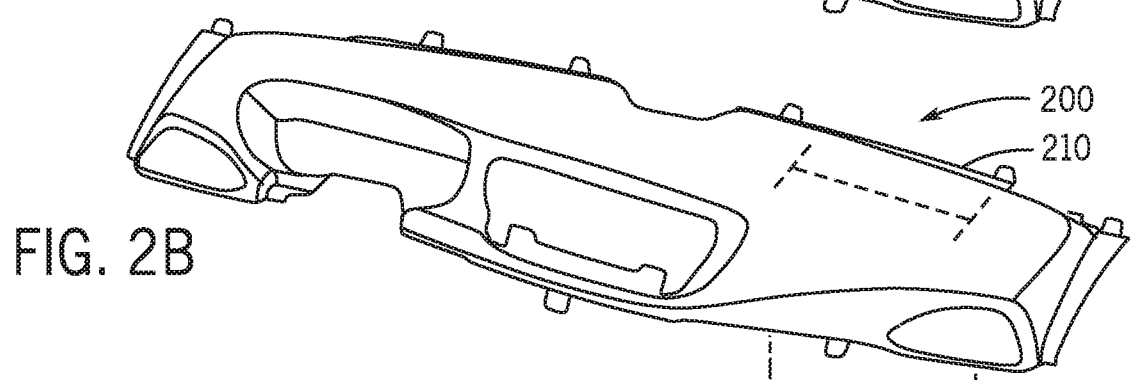
FIG. 2B is a schematic exploded perspective view of a vehicle trim component according to an exemplary embodiment.
Figure 2C:
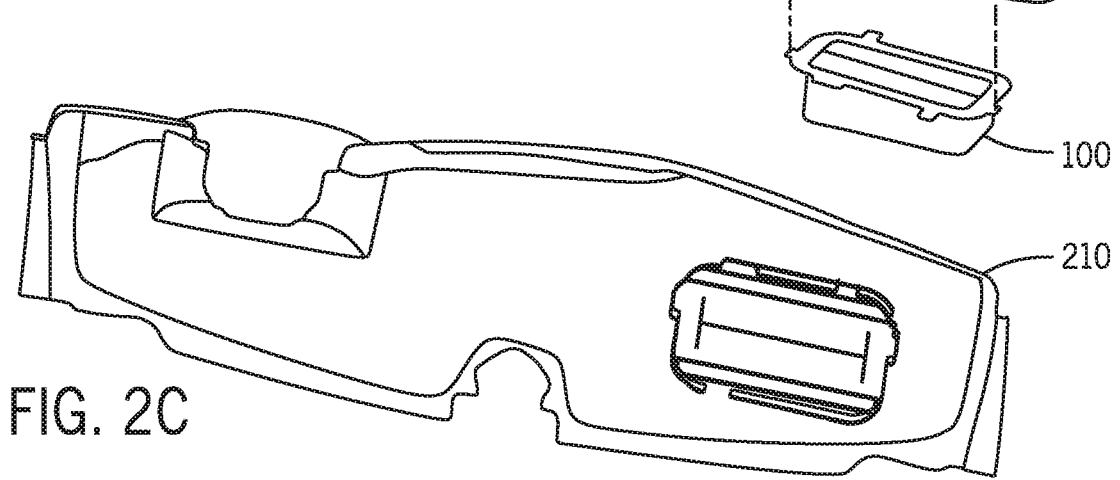
FIG. 2C is a schematic bottom perspective view of a structural substrate of a vehicle trim component according to an exemplary embodiment
Figure 2D:
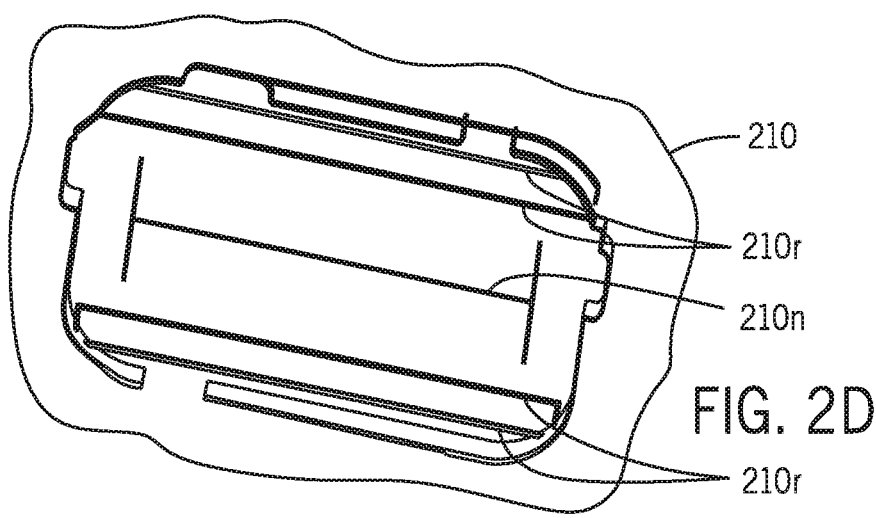
FIG. 2D is a schematic bottom perspective cut-away view of a structural substrate of a vehicle trim component according to an exemplary embodiment.

Referring to FIGS. 1A and 1B, a vehicle V is shown including an interior I with an instrument panel IP, doors D and a floor console FC. According to an exemplary embodiment, interior components of vehicle V such as instrument panel IP and doors D may include trim panels comprised of fiber and plastic. According to an exemplary embodiment, instrument panel IP and doors D may provide visible surfaces in the vehicle interior of vehicle V. According to an exemplary embodiment, instrument panel IP and/or doors D may provide at least one airbag behind the visible surfaces; instrument panel IP and/or doors D may provide a weakened area to aid the airbag in breaking through the trim panel during airbag deployment. See FIGS. 1D-1F.

According to an exemplary embodiment as shown schematically in FIGS. 1C-1F, a component for a vehicle interior (such as a trim panel, instrument panel, etc.) may be configured to provide/support a module with an airbag configured to be deployed through an opening into the vehicle interior. See also FIGS. 3A and 9A-9D. As shown schematically in FIGS. 1C-1F, instrument panel IP may provide a weakened shape/zone shown as a recess R to facilitate an airbag AB deployment through an airbag door ABD. According to an exemplary embodiment, the weakened shape/zone may comprise at least one of a recess or a score line behind the visible surface of instrument panel IP. The weakened shape/zone may comprise an "H" shape pattern. According to an exemplary embodiment, the weakened shape/zone may comprise a "U" shape pattern, a "bow tie" shape pattern, or any pattern suitable for airbag deployment.

Figure 3A:
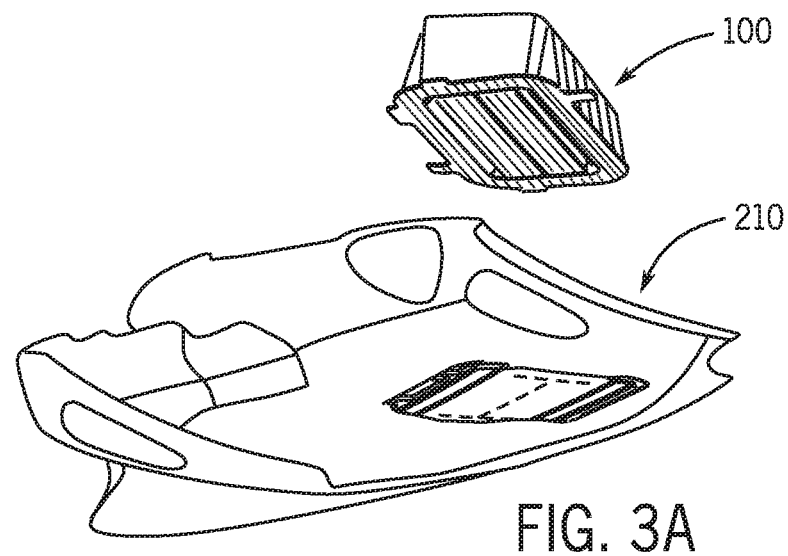
FIG. 3A is a schematic exploded perspective view of a vehicle trim component according to an exemplary embodiment.
Figure 3B:
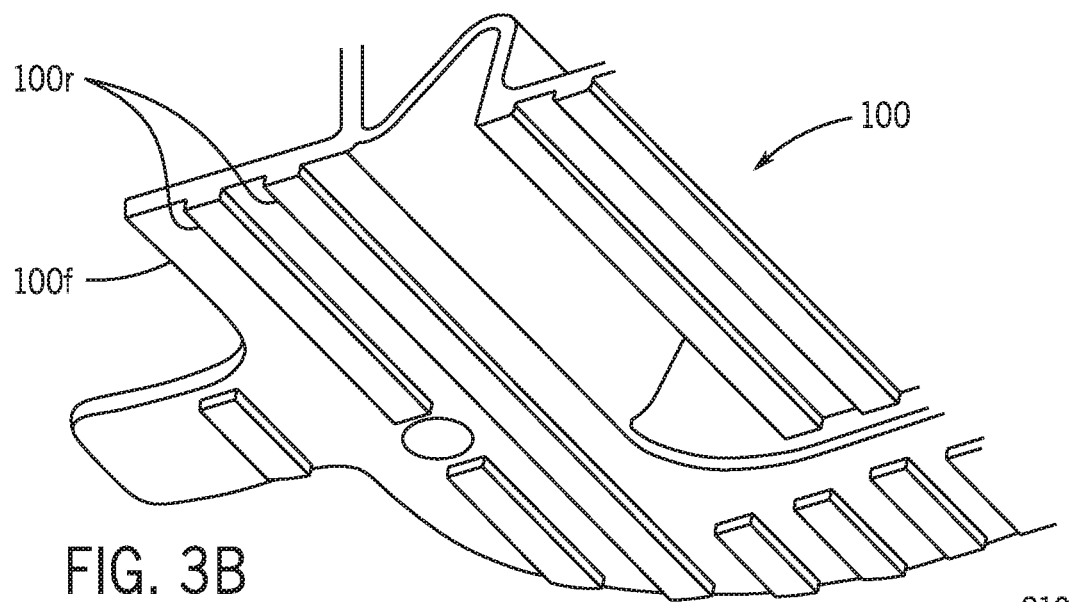
FIG. 3B is a schematic partial perspective view of an airbag chute according to an exemplary embodiment.
Figure 3C:
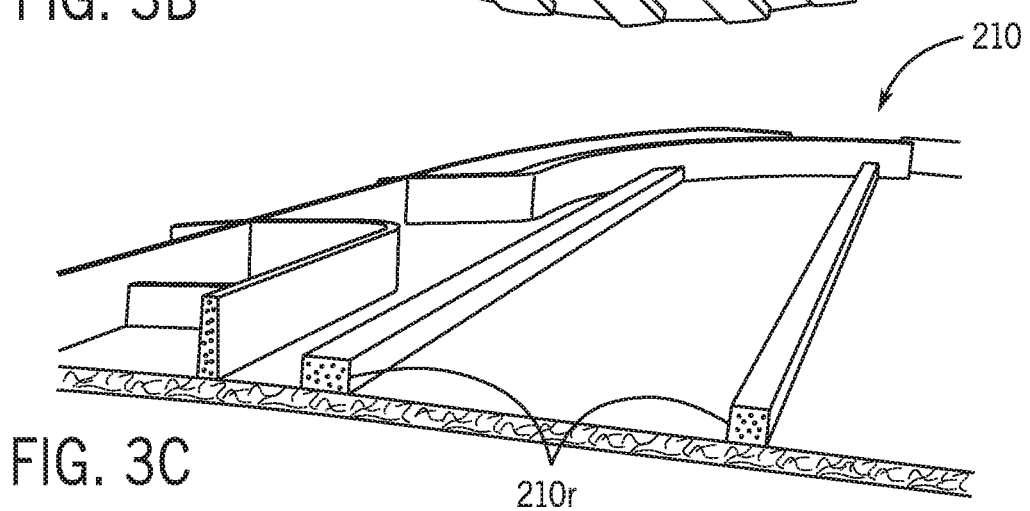
FIG. 3C is a schematic partial perspective view of a structural substrate of a vehicle interior component according to an exemplary embodiment.

As shown schematically according to an exemplary embodiment in FIGS. 2A-2D, the component 1000 may comprise a structural substrate 210 and an airbag chute 100 and a structure/interface between the structural substrate and the airbag chute configured to couple the airbag chute to the structural substrate (e.g. features shown as a rib 210r injection molded onto the structural substrate, features 100r on the airbag chute, etc.). See also FIGS. 3A-3C.

As shown schematically according to an exemplary embodiment in FIGS. 2A-2B, 3A and 6A-6C, the airbag chute 100 may be welded to form a bond B/interface F at the structure to bond to the structural substrate 210 and/or the airbag chute may be welded to form a bond B/interface F at the structure and the structural substrate 210. See e.g. FIGS. 6B-6C (showing bond B/interface F established between airbag chute 100 and structural substrate 210).

As shown schematically according to an exemplary embodiment in FIGS. 1C-1F, 2A-2D and 3A-3C, the component (e.g. trim/instrument panel IP) may comprise a structural substrate and a structure coupled to the structural substrate and configured to facilitate deployment of the airbag (shown as an airbag chute 100); and an interface may be provided to couple the structural substrate and the airbag chute (e.g. structure configured to facilitate deployment of the airbag); the interface may comprise a feature on the structural substrate and/or a feature on the structure configured to facilitate deployment of the airbag. See e.g. FIGS. 5A-5D, 6A-6C, 7A-7B and 8A-8B. As indicated schematically according to an exemplary embodiment, the interface may comprise a bond configured to attach the structure configured to facilitate deployment of the airbag to the structural substrate; the bond of the interface may comprise a weld (e.g. ultrasonic weld, etc.). See e.g. FIGS. 6A-6C, 7A-7B and 8A-8B. As indicated schematically according to an exemplary embodiment, the interface may comprise a bond to a surface of the structural substrate; the interface may comprise a feature on the structural substrate and a feature on the structure configured to facilitate deployment of the airbag; the interface may comprise (a) a bond between the feature the structural substrate and the feature on the structure configured to facilitate deployment of the airbag; and (b) a bond to a surface of the structural substrate. See e.g. FIGS. 6A-6C, 7A-7B, 8A-8B and 9A-9D. As indicated schematically according to an exemplary embodiment, the bond may comprise at least one of a weld and/or an adhesive; the interface may comprise at least one molded feature and/or a mounting area on the structural substrate. See e.g. FIGS. 6C, 7B, 8B and 9B.

As shown schematically according to an exemplary embodiment in FIGS. 7A-7B and 8A-8B, the airbag chute 100x may comprise members such as a flange and/or set of flanges 100f (e.g. providing a feature such as a rib); the structure/features shown as ribs 210r may be positioned between the structural substrate 210/210x and the members/flange 100f of the airbag chute 100x. As shown schematically according to an exemplary embodiment, a member/flange may comprise a rib; a rib injection may be molded onto the structural substrate; the rib arrangement may comprise an interface configured to bond the airbag chute to the structural substrate. See FIGS. 3A-3C, 7A-7B and 8A-8B (bond at interface established between feature shown as flange 100f of airbag chute 100x and features 210r shown as ribs of structural substrate 210/210x).

As shown schematically according to an exemplary embodiment in FIGS. 4A-4G and 5A-5D, the structural substrate 210 may comprise a panel comprised at least partially of fibers; the structure for the interface shown as features 210r may be comprised of resin. See also FIGS. 3C and 9A-9D. According to an exemplary embodiment indicated schematically, the structural substrate may comprise a fiber panel and/or a material comprising fibers; the airbag chute may comprise a plastic/resin material such as thermoplastic polyolefin; the structure/interface may comprise a resin material such as polypropylene (which may also comprise fibers such as structural fibers).

As shown schematically according to an exemplary embodiment in FIGS. 4A-4G and 5A-5D, the structural substrate 210 may comprise a fiber panel 202t/202u; the structural substrate may comprise a compression formed component formed from the fiber panel 202t. As shown schematically according to an exemplary embodiment in FIGS. 9A-9D, the component 1000 may comprise a composite structure (e.g. to provide a trim component/panel shown as instrument panel IP with cover/surface) comprising the structural substrate 210 (e.g. with features such as ribs 210r and/or border 220b) and interface/bond to the airbag chute 100 (e.g. the structure configured to facilitate deployment of the airbag). See also FIGS. 1D-1F and 3A (structure configured to facilitate deployment of the airbag may comprise an airbag chute configured to facilitate deployment of the airbag from the airbag module). As shown schematically according to an exemplary embodiment in FIGS. 6C, 7B, 8B and 9B, the interface may comprise at least one of a bond (e.g. attachment, weld, ultrasonic weld, etc.) of the airbag chute 100/100x to the structural substrate 210/210x. As shown schematically according to an exemplary embodiment in FIGS. 7A-7B and 8A-8B, the interface may comprise a feature 100f on the airbag chute 100; the interface may comprise a feature 210r molded onto the structural substrate. As indicated schematically according to an exemplary embodiment, the interface may comprise a structure; the structure may comprise an interface configured to bond the airbag chute to the structural substrate. See e.g. FIGS. 3A-3C. As indicated schematically according to an exemplary embodiment, the structure of the interface may comprise at least one of (a) a composite material; (b) a resin material; (c) a material comprising fibers; (d) polypropylene with fibers. As shown schematically according to an exemplary embodiment in FIGS. 9A-9D, the component may comprise a composite structure comprising the structural substrate and the structure configured to facilitate deployment of the airbag; the structure configured to facilitate deployment of the airbag may comprise an airbag chute; the airbag module may be configured to deploy the airbag through an opening in the composite structure; the interface may comprise a feature of the airbag chute; the feature may comprise at least one flange; the interface may be between the structural substrate and the at least one flange of the airbag chute. See e.g. FIGS. 1D-1F.

According to an exemplary embodiment as indicated schematically in FIGS. 1D-1F, 2A-2D, 3A-3C, 4A-4G, 5A-5D, 6A-6C, 7A-7B, 8A-8B and 9A-9D, the component for a vehicle interior configured to provide a module with an airbag configured to be deployed through an opening into the vehicle interior comprising a structural substrate an airbag chute and an interface configured to couple the structural substrate and the airbag chute; the interface may comprise a feature on the structural substrate. The substrate may comprise a compression-formed component formed from a fiber panel; the interface may comprise (a) a bond of the feature to the structural substrate and (b) coupling the airbag chute to the feature. See e.g. FIGS. 4A-4G, 6C, 7B and 8B. The bond may comprise injection molding of the feature to the structural substrate. See e.g. FIGS. 5A-5D. As indicated schematically in FIGS. 6C, 7B and 8B, the interface may comprise a bond comprising at least one of a weld and/or an adhesive; the interface may comprise a bond configured to attach the feature to the surface of the structural substrate; the interface may comprise (a) a bond between the feature the structural substrate and a feature of the airbag chute; and (b) a bond to a surface of the structural substrate; the interface may comprise at least one molded feature; the interface may comprise a structure; the structure of the interface may comprise at least one of (a) a composite material; (b) a resin material; (c) a material comprising fibers; (d) polypropylene with fibers; (e) a material molded onto the structural substrate. As indicated schematically in FIGS. 9A-9B, the component may comprise a composite structure comprising the structural substrate and the airbag chute; the airbag module may be configured to deploy the airbag through an opening in the composite structure. As indicated schematically according to an exemplary embodiment, the interface may comprise the feature and a mounting area on the structural substrate; the interface may comprise the feature on the structural substrate and a feature of the airbag chute; the interface may comprise a bond configured to attach the feature of the airbag chute to the structural substrate; the feature of the airbag chute may comprise at least one flange; the interface may comprise a bond to a surface of the structural substrate. See e.g. FIGS. 4A-4G, 6C, 7B and 8B.

As shown schematically according to an exemplary embodiment, the interface may comprise at least one of (a) a molded feature on the structural substrate; (b) a resin feature on the structural substrate; (c) a mounting area on the structural substrate; (d) a structure injection molded on the structural substrate; (e) a rib; (f) a set of ribs; (g) a rib injection molded onto the structural substrate; (h) a flange on airbag chute; (i) a weld; (j) an ultrasonic weld; (k) a bond; (l) an attachment; (m) a composite material; (n) a resin material; (o) a material comprising fibers; (p) polypropylene with fibers; (q) a material molded onto the structural substrate. See e.g. FIGS. 3A-3C, 5A-5D, 6A-6C, 7A-7B, 8A-8B and 9B.

Figure 9A:
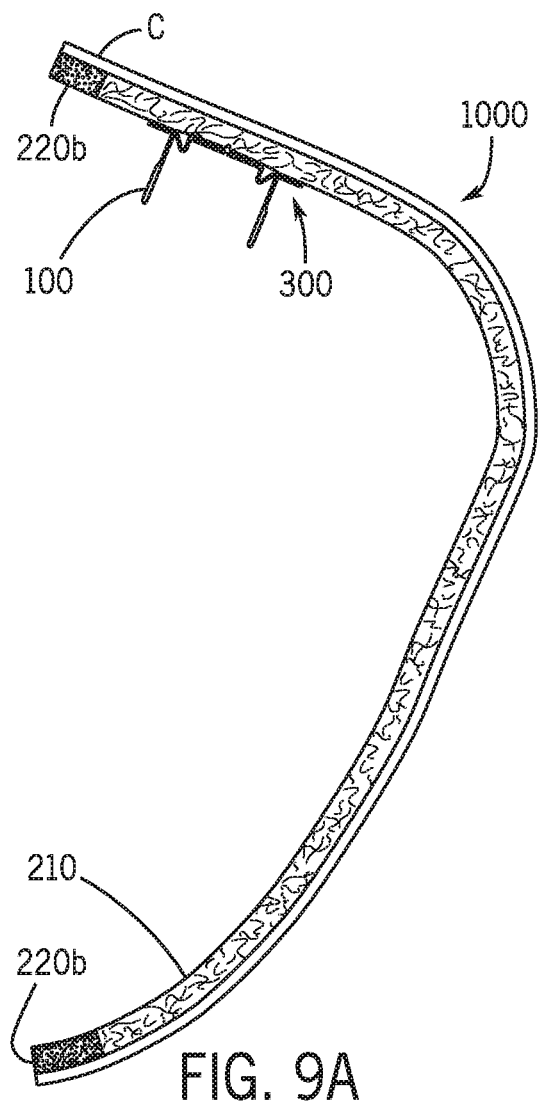
FIG. 9A is a schematic section view of a vehicle trim component according to an exemplary embodiment.
Figure 9B:
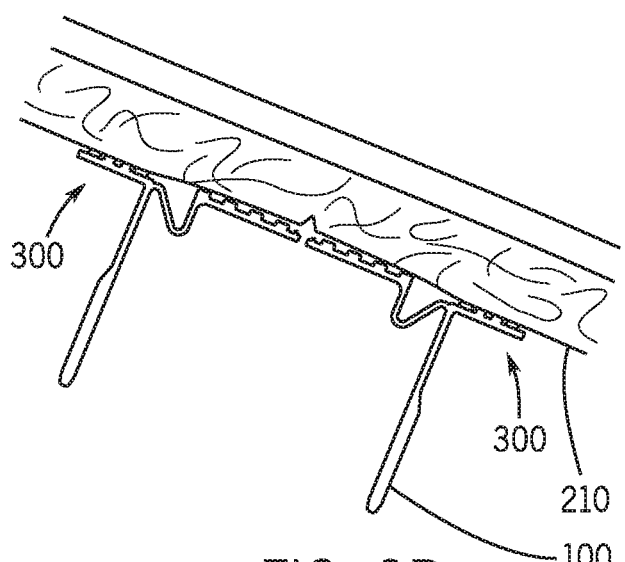
FIG. 9B is a schematic cut-away section view of a vehicle trim component according to an exemplary embodiment.
Figure 9C:
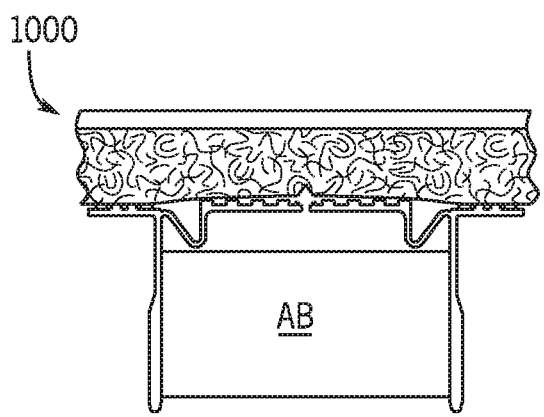
FIGS. 9C through 9D are schematic cut-away section views of a deployment of an airbag through a vehicle trim component according to an exemplary embodiment.
Figure 9D:
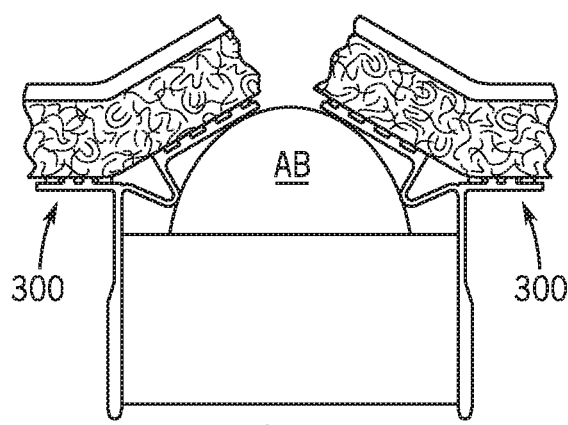

As shown schematically according to an exemplary embodiment in FIGS. 1B and 9A, the component may comprise at least one of (a) a trim component; (b) an instrument panel; (c) a trim panel.

According to an exemplary embodiment as indicated schematically in FIGS. 1D-1F, 2A-2D, 3A-3C, 4A-4G, 5A-5D, 6A-6C, 7A-7B, 8A-8B and 9A-9D, a component 1000 for a vehicle interior configured to support an airbag module providing an airbag configured to be deployed through an opening into the vehicle interior may comprise a structural substrate 210, an airbag chute 100/100x and a structure 300 between the structural substrate 210 and the airbag chute 100/100x; the structure 300 may be configured to couple the airbag chute 100/100x to the structural substrate 210. The structure 300 may be configured to couple the airbag chute 100/100x to the structural substrate 210 during deployment of the airbag. The structure 300 may comprise a rib 210r injection molded onto the structural substrate 210. The structure 300 may be bonded to the structural substrate 210. The airbag chute 100/100x may be welded to the structure 300. The airbag chute 100/100x may be welded to the structure 300 and the structural substrate 210. The structural substrate 210 may comprise a panel comprised at least partially of fibers; the structure 300 may be comprised of resin. The structural substrate 210 may comprise a first material; the airbag chute 100/100x may comprise a second material; the structure 300 may comprise a third material; the third material may be different than the first material and the second material. The first material may comprise a composite comprising fibers; the second material may comprise thermoplastic polyolefin; the third material may comprise a resin. The structural substrate 210 may comprise a fiber panel; the airbag chute 100/100x may comprise a thermoplastic polyolefin; the structure 300 may comprise polypropylene. The structure 300 may comprise polypropylene filled with structural fibers. The airbag chute 100/100x may be welded to the structural substrate 210; the airbag chute 100/100x may be welded to the structure 300. The structure 300 may comprise a composite comprising fibers; the fibers may be configured to reinforce an interface between the airbag chute 100/100x and the structural substrate 210. The airbag chute 100/100x may comprise at least one flange 100f; the structure 300 may be positioned between the structural substrate 210 and the at least one flange 100f of the airbag chute 100/100x. The airbag chute 100/100x may comprise a first flange and a second flange; the first flange may comprise a rib 100r; the second flange may comprise a rib 100r; the structure 300 may comprise the rib 100r of the first flange; the rib 100r of the second flange, a rib 210r injection molded onto the structural substrate 210 adjacent the rib 100r of the first flange; and a rib 210r injection molded onto the structural substrate 210 adjacent the rib 100r of the second flange. The rib 210r injection molded onto the structural substrate 210 adjacent the rib 100r of the first flange may comprise a set of ribs 210r surrounding the rib 100r of the first flange. The rib 100r of the first flange may comprise a height; the rib 210r injection molded onto the structural substrate 210 adjacent the rib 100r of the first flange may comprise a height; the height of the rib 100r of the first flange may be generally the same as the height of the rib 210r injection molded onto the structural substrate 210 adjacent the rib 100r of the first flange. The structure 300 may comprise an interface configured to bond the airbag chute 100/100x to the structural substrate 210. The component 1000 may comprise at least one of (a) a trim component; (b) an instrument panel; (c) a trim panel.

According to an exemplary embodiment as shown schematically in FIGS. 10A-10B and 11, the component for a vehicle interior configured to support an airbag module providing an airbag for deployment through an opening into the vehicle interior may be manufactured/produced by a process comprising the steps of: (a) providing a fiber panel; (b) compressing the fiber panel in the mold; (c) forming a feature on the structural substrate; and (d) joining an airbag chute to the structural substrate. See also FIGS. 1B-1C, 2A-2 and 9A-9D. As shown schematically according to an exemplary embodiment in FIGS. 3A-3C, 5A-5D, 6A-6C, 7A-7B, 8A-8B and 9A-9D, the feature may be configured to couple the airbag chute to the structural substrate; the step of forming a feature on the structural substrate may comprise forming a structure for joining the airbag chute to the structural substrate; the feature may comprise an injection-molded structure. See e.g. FIGS. 5A-5D. As indicated schematically according to an exemplary embodiment, the step of joining an airbag chute may comprise welding the airbag chute to the structure; the step of joining an airbag chute may comprise welding the airbag chute to the structural substrate. See e.g. FIGS. 6C, 7B and 8B. As shown schematically according to an exemplary embodiment in FIGS. 4A-4E, the step of compressing the fiber panel in the mold may comprise compressing the fiber panel into a structural substrate having a shape. See also FIGS. 10A-10B and 11. As shown indicated schematically according to an exemplary embodiment in FIGS. 10A-10B and 11, the process may comprise the step of forming a composite structure for the component 1000 comprising a cover C on the structural substrate 210. See e.g. FIGS. 1C and 9A.

Exemplary Embodiment—Method of Manufacture

According to an exemplary embodiment as shown schematically in FIG. 10A, a method of manufacturing a vehicle trim component 1000 may comprise the steps of providing a substrate layer (e.g. fiber mat, etc.) as a base for a pre-form substrate, forming the pre-form substrate (e.g. consolidating, compressing, merging/fusing, heating/melting, shaping, cutting/sizing, etc.), pre-treating/heating the pre-form substrate, forming the structural substrate (e.g. compressing/molding the pre-form substrate), joining a rib to the structural substrate, joining an airbag chute to the rib/structural substrate, applying a cover to the structural substrate and finishing/providing a panel assembly (with the cover on the structure/substrate).

According to an exemplary embodiment as shown schematically in FIG. 10B, a method of manufacturing a vehicle trim component 1000 may comprise the steps of providing a substrate layer (e.g. fiber mat, etc.) as a base for a pre-form substrate, forming the pre-form substrate (e.g. consolidating, compressing, merging/fusing, heating/melting, shaping, cutting/sizing, etc.), pre-treating/heating the pre-form substrate, forming the structural substrate (e.g. compressing/molding the pre-form substrate) in a mold, injection molding a rib onto the structural substrate in the mold, removing the structural substrate with the rib from the mold, applying a cover to the structural substrate with the chute and finishing/providing a panel assembly (with the cover on the structure/substrate).

According to an exemplary embodiment as shown schematically in FIG. 11, a method of manufacturing a vehicle trim component 1000 may comprise the steps of providing a fiber mat, forming a pre-form substrate, heating the pre-form substrate, forming a structural substrate in a mold, injection molding a rib onto the structural substrate in the mold, removing the structural substrate with the rib from the mold, welding an airbag chute to the rib and the structural substrate, applying a cover to the structural substrate with the chute and finishing/providing a panel assembly (with the cover on the structure/substrate).

Exemplary Embodiment

Figure 4A:
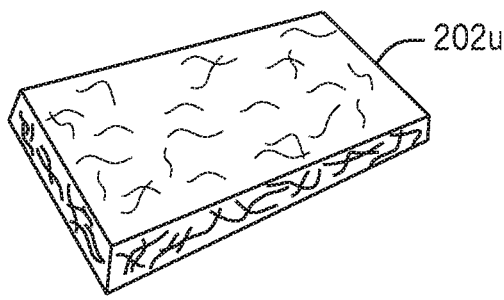
FIGS. 4A through 4G are schematic perspective views of a process to form a structural substrate of a vehicle trim component according to an exemplary embodiment.
Figure 4B:
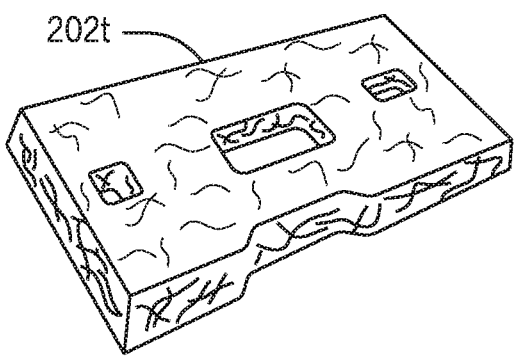
Figure 4C:
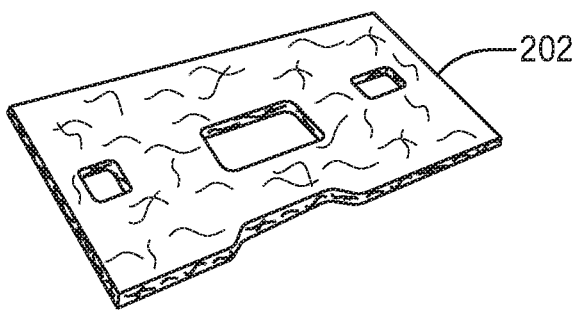
Figure 4D:
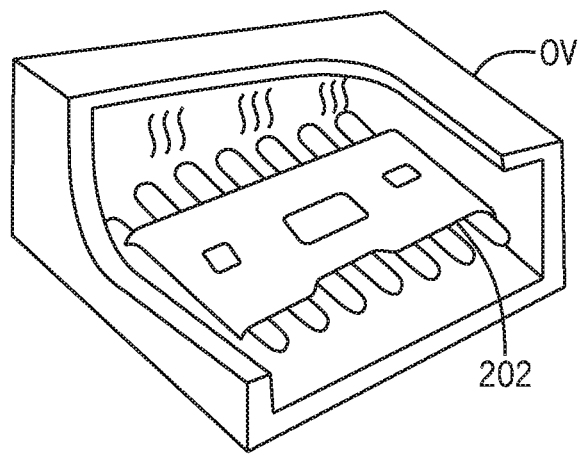
Figure 4E:
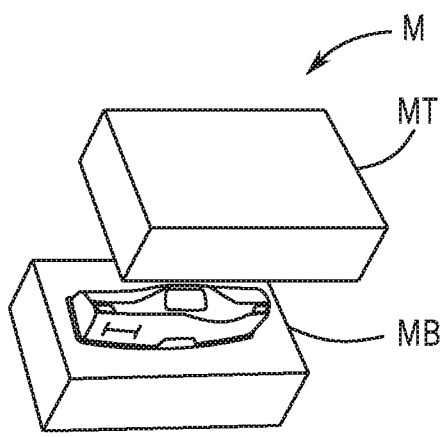
Figure 4F:
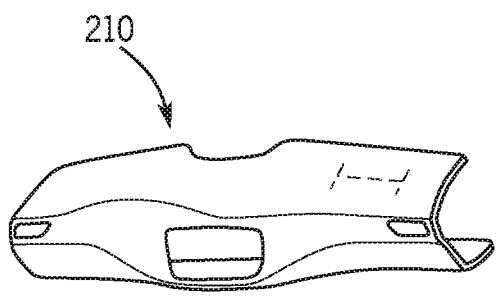
Figure 4G:
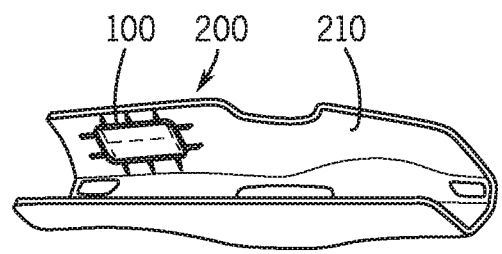
Figure 5A:
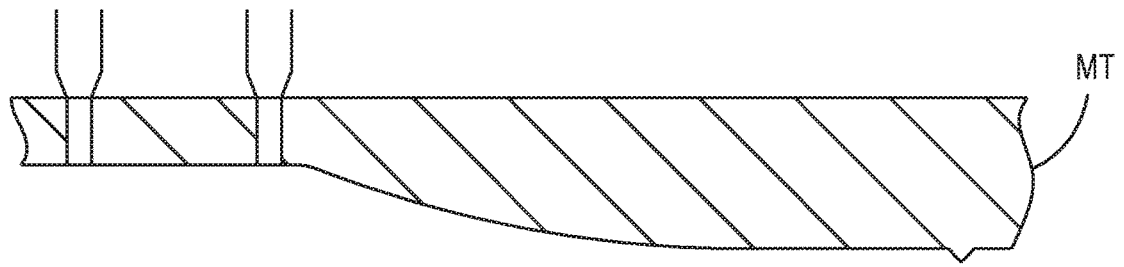
FIGS. 5A through 5D are schematic partial section views of a process to form a vehicle trim component according to an exemplary embodiment.
Figure 5B:
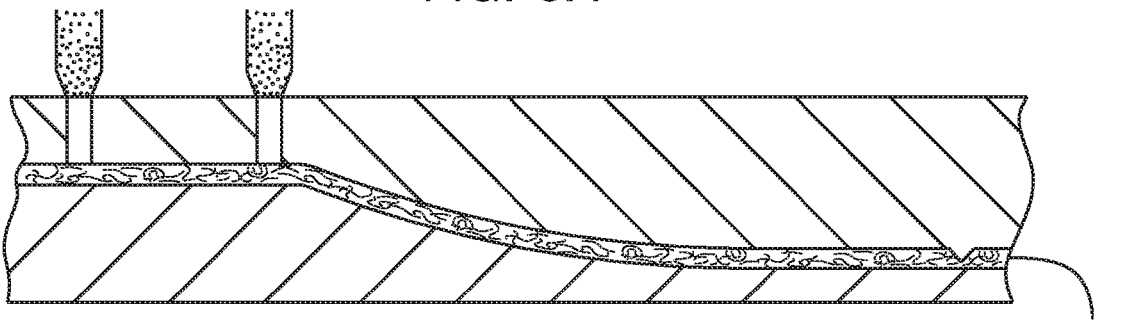
Figure 5C:
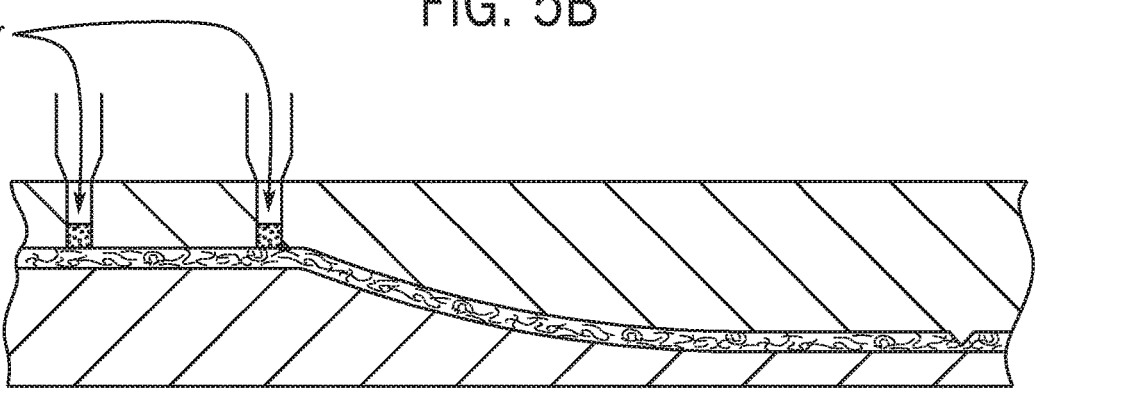
Figure 5D:
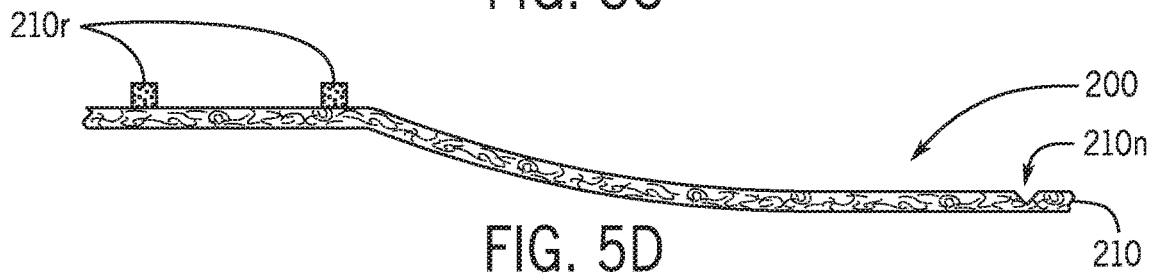
Figure 6A:
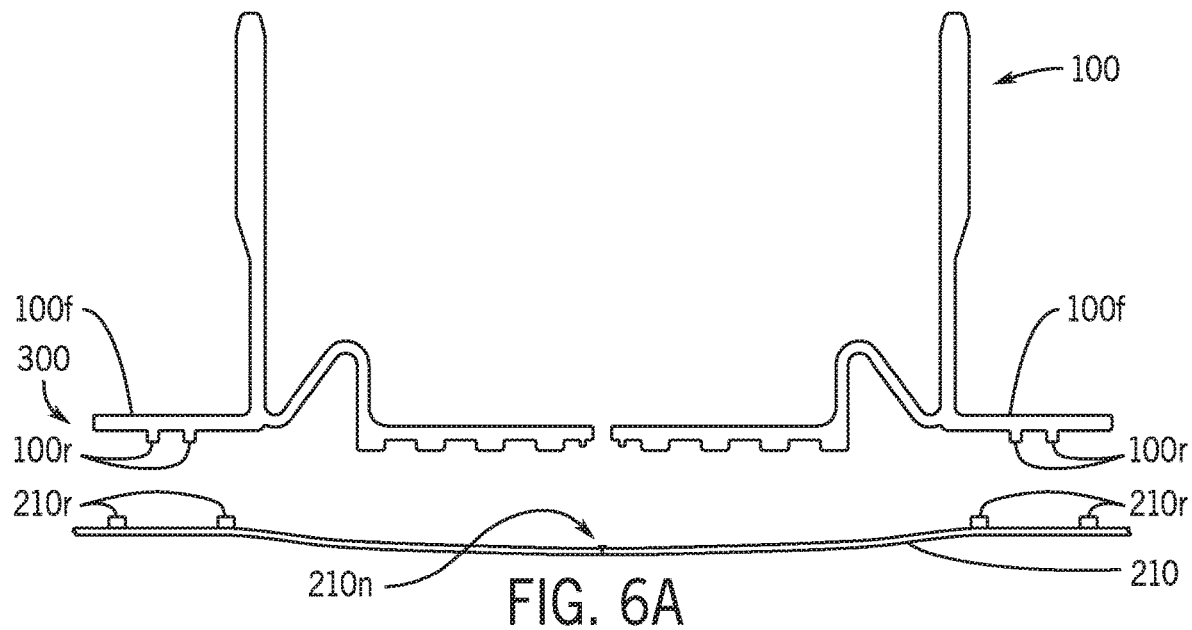
FIGS. 6A through 6C are schematic partial section views of a process to form a vehicle trim component according to an exemplary embodiment.
Figure 6B:
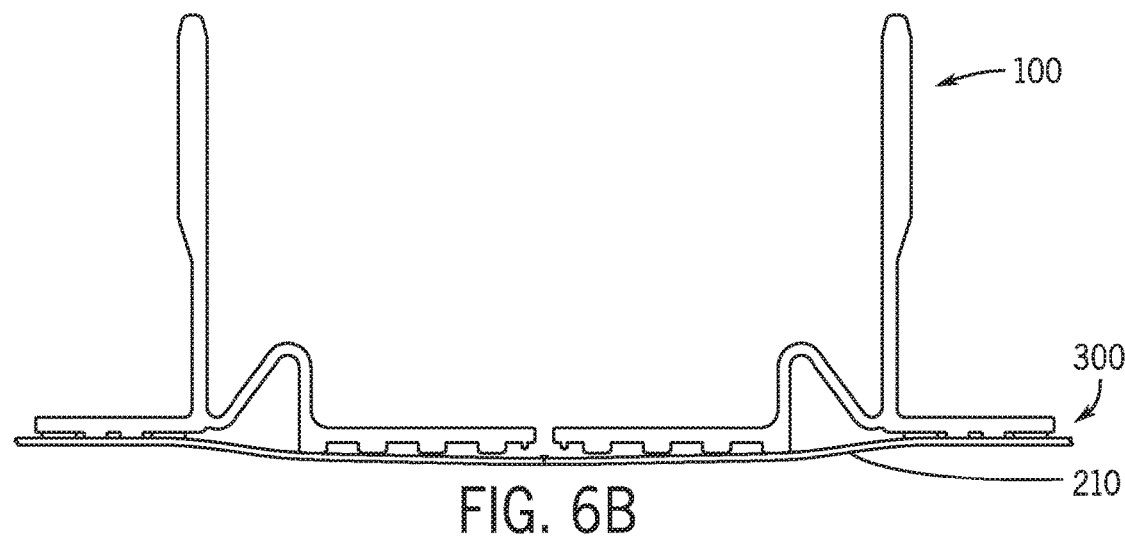
Figure 6C:
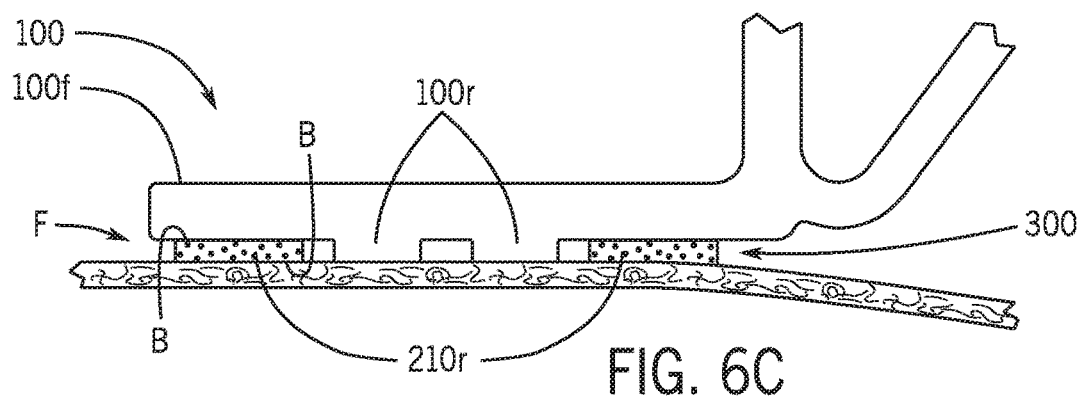
Figure 7A:
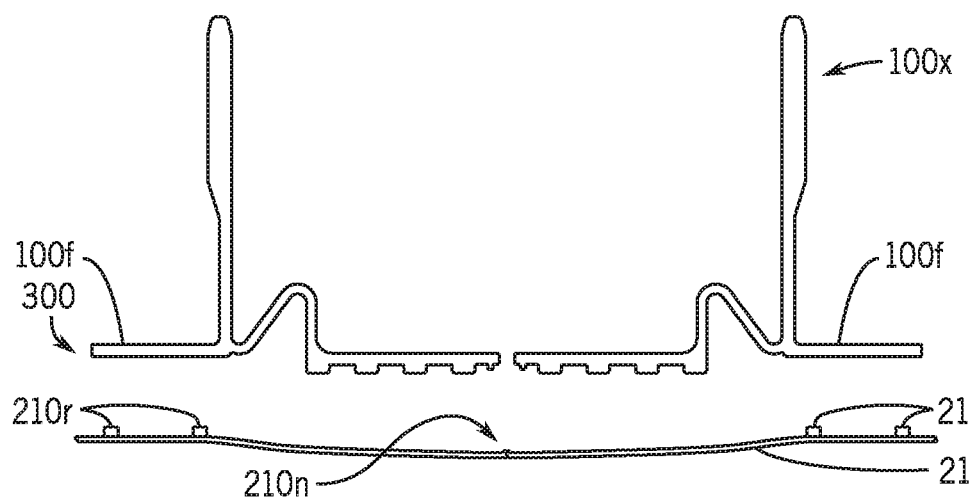
FIGS. 7A through 7B are schematic partial section views of a process to form a vehicle trim component according to an exemplary embodiment.
Figure 7B:
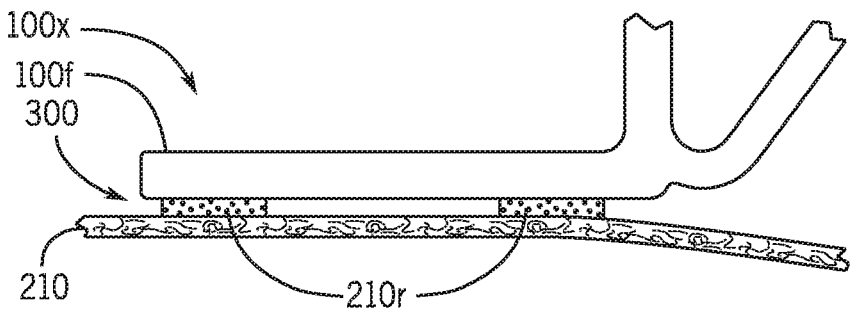
Figure 8A:
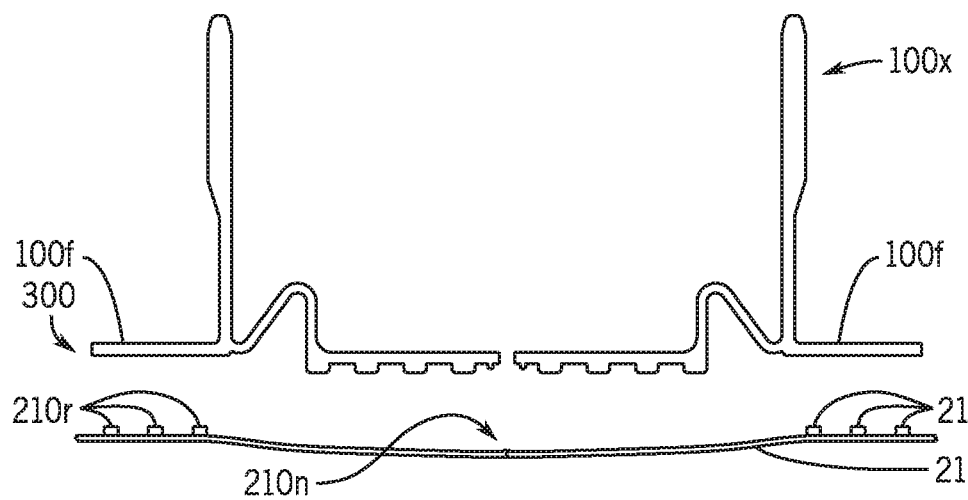
FIGS. 8A through 8B are schematic partial section views of a process to form a vehicle trim component according to an exemplary embodiment.
Figure 8B:
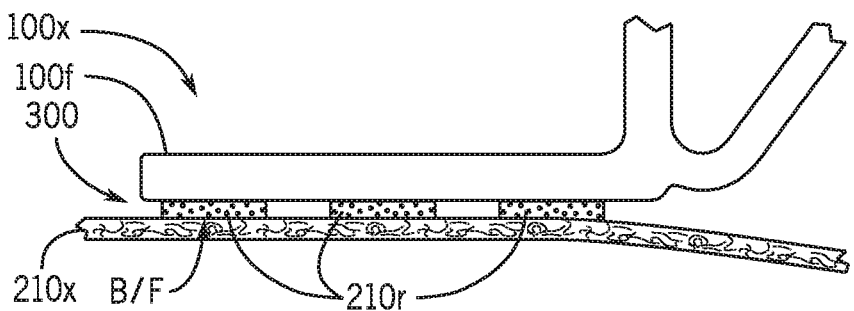

According to an exemplary embodiment as shown schematically in FIG. 4A, a fiber mat 202u may comprise a combination of fibers (e.g. natural and/or synthetic fibers) and thermoplastic resin (e.g. polypropylene (PP), acrylonitrile butadiene styrene (ABS), polycarbonate (PC), etc.). According to an exemplary embodiment as shown schematically in FIG. 4B, fiber mat 202u may be trimmed into a fiber mat 202t having a thickness. According to an exemplary embodiment, fiber mat 202t may be heated to induce the thermoplastic resin to liquefy. According to an exemplary embodiment as shown schematically in FIG. 4C, heated fiber mat 202t may be partially compressed into a fiber panel 202 having a thickness less than the thickness of fiber mat 202t. According to an exemplary embodiment as shown schematically in FIG. 4D, fiber panel 202 may be heated in an oven OV. As shown schematically in FIG. 4E, heated fiber panel 202 may be transferred into a mold having a mold top MT and mold bottom MB. According to an exemplary embodiment as shown schematically in FIG. 4F, a component shown as an instrument panel substrate 200 may be produced by a process of compression forming heated fiber panel 202 into a structural substrate 210 and injection molding resin onto compression formed heated fiber panel 202.

According to an exemplary embodiment, instrument panel substrate 200 may provide a plastic rib on a back side of structural substrate 210 to improve structural integrity and rigidity of structural substrate 210. Structural substrate 210 may be configured to support an airbag chute 100 and an airbag module comprising an airbag. As shown schematically in FIG. 9A, structural substrate 210 may comprise a border 220b to provide reinforcement and/or dimensional accuracy for structural substrate 210. According to an exemplary embodiment, a plastic rib may be placed at any location on structural substrate 210 (e.g. along an edge of structural substrate 210, in the middle of structural substrate 210, etc.). According to an exemplary embodiment, multiple plastic ribs may be placed at various different locations on structural substrate 210. According to an exemplary embodiment, a plastic rib may improve structural integrity of instrument panel substrate 200. According to an exemplary embodiment, instrument panel substrate 200 may be able to maintain structural integrity during an airbag deployment; the position/placement of a plastic rib may be intended to create a strength differential between different areas of instrument panel substrate 200; energy needed for an airbag to break through a vehicle interior component 1000 may be directed to a recess 210n of structural substrate 210; a plastic rib may prevent or minimize ripping or tearing of structural substrate 210 at any location other than at recess 210n during an airbag deployment. A plastic rib forming a honeycomb shaped pattern may improve structural integrity and rigidity. According to an exemplary embodiment, a plastic rib may be formed in any configuration according to a specific application (e.g. ancillary features for attaching air vents, speakers or infotainment system, etc.). According to an exemplary embodiment as shown schematically in FIG. 2B, a trim component 1000 for a vehicle interior may comprise airbag chute 100 and instrument panel substrate 200.

According to an exemplary embodiment as shown schematically in FIGS. 9A-9D, a trim component 1000 for a vehicle interior may be configured to support an airbag module providing an airbag AB configured to be deployed through an opening into the vehicle interior. Trim component 1000 may comprise a structural substrate 210 providing a front side, a back side and at least one door established upon deployment of the airbag to facilitate deployment of the airbag from the airbag module through the opening, an airbag chute 100 and a structure 300 positioned between structural substrate 210 and airbag chute 100. Structure 300 may be configured to secure airbag chute 100 to structural substrate 210. Structure 300 may be configured to secure airbag chute 100 to structural substrate 210 during deployment of airbag AB. Structure 300 may comprise a rib injection molded onto the back side of structural substrate 210. Structure 300 may be bonded to structural substrate 210. Structural substrate 210 may comprise a panel comprised at least partially of fibers; structure 300 may be comprised of resin. Structural substrate 210 may comprise a fiber panel; airbag chute 100 may comprise a thermoplastic polyolefin; structure 300 may comprise polypropylene. Structure 300 may comprise polypropylene filled with structural fibers. Airbag chute 100 may be welded to structure 300. Airbag chute 100 may be welded to structural substrate 210. Structure 300 may comprise a composite comprising fibers; the fibers may be configured to reinforce an interface between airbag chute 100 and structural substrate 210. Airbag chute 100 may comprise at least one flange 100f; structure 300 may be positioned between structural substrate 210 and the at least one flange 100f of airbag chute 100.

According to an exemplary embodiment as shown schematically in FIGS. 2A-2D, 4A-4G, and 9A-9B, a trim component 1000 for a vehicle interior configured to support an airbag module providing an airbag AB for deployment through an opening into the vehicle interior may be prepared using a mold M by a process comprising the steps of providing a fiber panel 202; disposing fiber panel 202 onto a first surface of mold M; compressing fiber panel 202 between the first surface and a second surface of mold M to form fiber panel 202 into a structural substrate 210 having a shape corresponding to a first contour of the first surface and a second contour of the second surface; molding a structure 300 on a side of structural substrate 210; and joining an airbag chute 100 to structure 300. Structure 300 may be configured to secure airbag chute 100 to structural substrate 210. Structure 300 may be configured to secure airbag chute 100 to structural substrate 210 during deployment of airbag AB. Molding structure 300 on a side of structural substrate 210 may comprise injecting resin into mold M. Joining airbag chute 100 to structure 300 may comprise welding airbag chute 100 to structure 300. Joining airbag chute 100 to structure 300 may comprise welding airbag chute 100 to structural substrate 210.

According to an exemplary embodiment as shown schematically in FIGS. 2A-2D, 4A-4G and 9A-9D, a method of manufacturing a vehicle trim component 1000 configured to support an airbag module providing an airbag AB for deployment from the airbag module through an opening into the vehicle interior may comprise the steps of providing a fiber panel 202; disposing fiber panel 202 onto a first surface of a mold M; compressing fiber panel 202 between the first surface and a second surface of mold M to form fiber panel 202 into a structural substrate 210 having a shape corresponding to a first contour of the first surface and a second contour of the second surface; molding a structure 300 on a side of structural substrate 210; and joining an airbag chute 100 to structure 300. Structure 300 may be configured to secure airbag chute 100 to structural substrate 210. Molding a structure 300 on a side of structural substrate 210 may comprise injecting resin into mold M. Joining airbag chute 100 to structure 300 may comprise welding airbag chute 100 to structure 300. Joining airbag chute 100 to structure 300 may comprise welding airbag chute 100 to structural substrate 210.

RELATED PATENT DOCUMENTS—INCORPORATION BY REFERENCE

The present application incorporates by reference (a) U.S. patent application Ser. No. 13/595,741 titled "SYSTEM AND METHOD FOR MANUFACTURING A VEHICLE TRIM COMPONENT VIA CONCURRENT COMPRESSION FORMING AND INJECTION MOLDING" filed Aug. 27, 2012 (now U.S. Pat. No. 8,939,745); (b) U.S. patent application Ser. No. 13/846,529 titled "SYSTEM AND METHOD FOR MANUFACTURING A VEHICLE TRIM COMPONENT VIA CONCURRENT COMPRESSION FORMING AND INJECTION MOLDING" filed on Mar. 18, 2013 (now U.S. Pat. No. 9,149,961); (c) U.S. patent application Ser. No. 14/808,938 titled "VEHICLE TRIM COMPONENT" filed Jul. 24, 2015 (now U.S. Pat. No. 10,118,325).

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior configured to support an airbag module providing an airbag configured to be deployed into the vehicle interior comprising:
   a structural substrate;
   an airbag chute; and
   a structure between the structural substrate and the airbag chute;
   wherein the structure is configured to couple the airbag chute to the structural substrate;
   wherein the structural substrate comprises a first material; wherein the airbag chute comprises a second material; wherein the structure comprises a third material; wherein the third material is different than the first material and the second material;
   wherein the structure comprises a weld rib;
   wherein the weld rib is comprised of the third material;
   wherein the first material for the structural substrate comprises fibers;
   wherein the third material comprises resin.

2. The component of claim 1 wherein the first material comprises a composite comprising fibers; wherein the third material is configured to facilitate joining of the weld rib to the second material of the airbag chute.

3. The component of claim 2 wherein the second material for the airbag chute comprises thermoplastic polyolefin.

4. The component of claim 1 wherein the structural substrate comprises a fiber panel; wherein the resin comprising the third material for the structure comprises polypropylene.

5. The component of claim 4 wherein the third material for the structure comprises polypropylene filled with structural fibers.

6. The component of claim 1 wherein the structural substrate comprises a fiber panel comprising the first material; wherein the weld rib comprising the third material comprises a resin feature injection molded onto the structural substrate comprising the fiber panel.

7. The component of claim 1 wherein the airbag chute comprises a first flange and a second flange; wherein the first flange comprises a rib; wherein the second flange comprises a rib; wherein the structure comprises the rib of the first flange; the rib of the second flange, the weld rib injection molded onto the structural substrate adjacent the rib of the first flange; and a second weld rib injection molded onto the structural substrate adjacent the rib of the second flange; wherein the rib of the first flange comprises a height; wherein the weld rib injection molded onto the structural substrate adjacent the rib of the first flange comprises a height; wherein the height of the rib of the first flange is generally the same as the height of the weld rib injection molded onto the structural substrate adjacent the rib of the first flange.

8. The component of claim 1 comprising at least one of (a) a trim component; (b) an instrument panel; (c) a trim panel.

9. A component for a vehicle interior configured to provide a module with an airbag configured to be deployed through an opening into the vehicle interior comprising:
   a structural substrate comprising a panel comprising a material;
   an airbag chute comprising a material; and
   an interface configured to couple the structural substrate and the airbag chute;
   wherein the structural substrate comprises a feature comprising a material;
   wherein the interface comprises (a) a bond of the feature to the panel and (b) a bond of the feature of the structural substrate to the airbag chute;
   wherein the material of the feature is different than the material of the panel;
   wherein the material of the feature is different than the material of the airbag chute;
   wherein the structural substrate comprises a surface;
   wherein the airbag chute comprises a surface facing the surface of the structural substrate;
   wherein the interface configured to couple the structural substrate and the airbag chute comprises an interface between the surface of the structural substrate and the surface of the airbag chute to couple the structural substrate and the airbag chute;
   wherein the bond of the feature to the panel comprises injection molding of the feature to the panel.

10. The component of claim 9 wherein the material of the feature comprises at least one of (a) a composite material; (b) a resin material; (c) a material comprising fibers; (d) polypropylene with fibers.

11. The component of claim 9 wherein the material of the panel comprises a composite material comprising fibers; wherein the material of the feature comprises a resin.

12. The component of claim 9 wherein the panel comprises a fiber panel; wherein the material of the feature comprises polypropylene.

13. The component of claim 9 wherein the surface of the airbag chute is substantially parallel to the surface of the structural substrate.

14. A component for a vehicle interior configured to provide a module with an airbag configured to be deployed through an opening into the vehicle interior comprising:
- a structural substrate;
- an airbag chute; and
- an interface configured to couple the structural substrate and the airbag chute;
- wherein the interface comprises a feature comprising a rib on the structural substrate;
- wherein the airbag chute comprises a flange comprising a rib comprising a height;
- wherein the rib on the structural substrate comprises a height;
- wherein the height of the rib of the flange and the height of the rib on the structural substrate are substantially the same height coupling the airbag chute to the structural substrate at the interface;
- wherein the structural substrate comprises a panel comprising a first material; wherein the feature comprises a second material different than the first material; wherein the second material for the feature comprising the rib is formed to bond onto the first material for the panel.

15. The component of claim 14 wherein the rib comprises at least one of (a) a molded feature on the structural substrate; (b) a resin feature on the structural substrate; (c) a structure injection molded on the structural substrate; (d) a set of ribs; (e) a rib injection molded onto the structural substrate; (f) a resin material; (g) a material comprising fibers; (h) polypropylene with fibers; Lil a material molded onto the structural substrate.

16. The component of claim 14 wherein the panel comprises a fiber panel comprising a surface; wherein the rib on the structural substrate is molded on the surface of the fiber panel.

17. The component of claim 14 wherein the panel comprises fibers; wherein the feature is a resin feature.

18. The component of claim 14 wherein the structural substrate comprises a compression-formed panel; wherein the rib on the structural substrate is an injection molded rib.

19. A component for a vehicle interior configured to provide a module with an airbag configured to be deployed through an opening into the vehicle interior comprising:
- a structural substrate;
- an airbag chute; and
- an interface configured to couple the structural substrate and the airbag chute;
- wherein the interface comprises a feature comprising a rib on the structural substrate;
- wherein the airbag chute comprises a flange comprising a rib comprising a height;
- wherein the rib on the structural substrate comprises a height;
- wherein the height of the rib of the flange and the height of the rib on the structural substrate are substantially the same height coupling the airbag chute to the structural substrate at the interface;
- wherein the structural substrate comprises a fiber panel comprising a surface; wherein the rib on the structural substrate is molded on the surface of the fiber panel.

20. The component of claim 19 wherein the rib comprises a weld rib.

* * * * *